US011305153B2

(12) United States Patent
Dalmia et al.

(10) Patent No.: US 11,305,153 B2
(45) Date of Patent: Apr. 19, 2022

(54) PORTABLE ELLIPTICAL EXERCISE MACHINE AND TRANSPORT MECHANISM

(71) Applicant: FITNESS CUBED INC., Chicago, IL (US)

(72) Inventors: Arnav Dalmia, Chicago, IL (US); Ryota Sekine, Chicago, IL (US); Glenn Polinsky, Vancouver, WA (US)

(73) Assignee: FITNESS CUBED INC., Chicago, IL (US)

( * ) Notice: Subject to any disclaimer, the term of this patent is extended or adjusted under 35 U.S.C. 154(b) by 58 days.

(21) Appl. No.: 16/892,978

(22) Filed: Jun. 4, 2020

(65) Prior Publication Data

US 2020/0298052 A1 Sep. 24, 2020

Related U.S. Application Data

(60) Continuation-in-part of application No. 16/582,407, filed on Sep. 25, 2019, now Pat. No. 11,045,686,
(Continued)

(51) Int. Cl.
*A63B 21/22* (2006.01)
*A63B 22/00* (2006.01)
(Continued)

(52) U.S. Cl.
CPC .......... *A63B 22/04* (2013.01); *A63B 21/0051* (2013.01); *A63B 21/00069* (2013.01);
(Continued)

(58) Field of Classification Search
CPC . A63B 22/04; A63B 21/1609; A63B 21/0051; A63B 21/225; A63B 22/0046;
(Continued)

(56) References Cited

U.S. PATENT DOCUMENTS 3,316,898 A 5/1967 Brown
3,561,758 A 2/1971 Huber
(Continued)

FOREIGN PATENT DOCUMENTS

CN 2925533 Y 7/2007
CN 201267689 Y 7/2009
(Continued)

OTHER PUBLICATIONS

International Search Report and Written Opinion of the International Searching Authority dated Feb. 4, 2016 from corresponding Application No. PCT/US2015/059476.
(Continued)

*Primary Examiner* — Andrew S Lo
(74) *Attorney, Agent, or Firm* — Katten Muchin Rosenman LLP

(57) ABSTRACT

An exercise apparatus having a pulley, a pair of stabilizing assemblies each configured to couple a front portion of a respective pedal element to each side of the pulley, a looped belt configured to couple the pulley to a resistance assembly, a tension stabilizer configured to maintain a tension of the looped belt on the pulley, and the resistance assembly configured to assert an adjustable resistance to the pedal elements through the looped belt. The exercise apparatus also comprises a transport mechanism with a handle for transporting the exercise apparatus.

8 Claims, 23 Drawing Sheets

Related U.S. Application Data which is a division of application No. 16/379,255, filed on Apr. 9, 2019, now Pat. No. 10,569,124, which is a continuation-in-part of application No. 16/141,010, filed on Sep. 25, 2018, now Pat. No. 10,252,102, which is a continuation-in-part of application No. 15/657,911, filed on Jul. 24, 2017, now Pat. No. 10,080,918, which is a continuation of application No. 15/108,077, filed as application No. PCT/US2015/059476 on Nov. 6, 2015, now Pat. No. 9,713,739.

(60) Provisional application No. 62/857,117, filed on Jun. 4, 2019, provisional application No. 62/077,170, filed on Nov. 7, 2014.

(51) Int. Cl.

| | | |
|---|---|---|
| *A63B 22/06* | (2006.01) | |
| *A63B 21/00* | (2006.01) | |
| *A63B 21/16* | (2006.01) | |
| *A63B 21/04* | (2006.01) | |
| *A63B 22/04* | (2006.01) | |
| *A63B 21/005* | (2006.01) | |
| *H04M 1/72403* | (2021.01) | |
| *A63B 71/06* | (2006.01) | |
| *A63B 24/00* | (2006.01) | |
| *A63B 23/035* | (2006.01) | |
| *A63B 21/055* | (2006.01) | |
| *A63B 23/12* | (2006.01) | |
| *H04M 1/72409* | (2021.01) | |
| *H04M 1/72412* | (2021.01) | |

(52) U.S. Cl.
CPC ........ *A63B 21/1609* (2015.10); *A63B 21/225* (2013.01); *A63B 22/0046* (2013.01); *A63B 22/06* (2013.01); *A63B 22/0664* (2013.01); *A63B 22/0694* (2013.01); *H04M 1/72403* (2021.01); *A63B 21/0054* (2015.10); *A63B 21/00196* (2013.01); *A63B 21/0442* (2013.01); *A63B 21/0552* (2013.01); *A63B 23/03541* (2013.01); *A63B 23/1209* (2013.01); *A63B 24/0084* (2013.01); *A63B 2022/0688* (2013.01); *A63B 2071/0683* (2013.01); *A63B 2210/50* (2013.01); *A63B 2220/24* (2013.01); *A63B 2220/805* (2013.01); *A63B 2220/806* (2013.01); *A63B 2225/20* (2013.01); *A63B 2225/50* (2013.01); *A63B 2225/64* (2013.01); *H04M 1/72409* (2021.01); *H04M 1/72412* (2021.01)

(58) Field of Classification Search
CPC ............ A63B 22/0664; A63B 22/0694; A63B 21/00069; A63B 22/06; A63B 2210/50; A63B 24/0084; A63B 23/03541; A63B 21/0552; A63B 23/1209; A63B 2220/24; A63B 21/0442; A63B 2225/50; A63B 2220/806; A63B 2220/805; A63B 2071/0683; A63B 2225/20; A63B 21/0054; A63B 2225/64; A63B 21/00196; A63B 2022/0688; A63B 21/05–0557; H04M 1/72522; H04M 1/72527; H04M 1/7253

See application file for complete search history.

(56) References Cited

U.S. PATENT DOCUMENTS

| | | |
|---|---|---|
| 3,831,942 A | 8/1974 | Del Mar |
| 3,917,261 A | 11/1975 | Small et al. |
| 4,645,204 A | 2/1987 | Berger |
| 4,968,028 A | 11/1990 | Wehrell |
| 4,993,407 A | 2/1991 | Chen |
| 5,072,929 A | 12/1991 | Peterson et al. |
| 5,199,931 A | 4/1993 | Easley et al. |
| 5,261,864 A | 11/1993 | Fitzpatrick |
| 5,429,565 A | 7/1995 | Hagg et al. |
| 5,529,554 A | 6/1996 | Eschenbach |
| 5,540,642 A | 7/1996 | Sprague |
| 5,549,526 A | 8/1996 | Rodgers, Jr. |
| 5,580,337 A | 12/1996 | Habing et al. |
| 5,584,783 A | 12/1996 | Hagg et al. |
| 5,618,249 A | 4/1997 | Marshall |
| 5,685,804 A | 11/1997 | Whan-Tong et al. |
| 5,860,941 A | 1/1999 | Saringer et al. |
| 5,904,638 A | 5/1999 | Habing et al. |
| 5,947,868 A | 9/1999 | Dugan |
| 6,019,710 A | 2/2000 | Dalebout et al. |
| 6,572,514 B1 | 6/2003 | Calafato |
| 6,685,607 B1 | 2/2004 | Olson |
| 6,705,976 B1 | 3/2004 | Piane, Jr. |
| 6,921,351 B1 | 7/2005 | Hickman et al. |
| 7,052,440 B2 | 5/2006 | Pyles et al. |
| 7,153,238 B2 | 12/2006 | Anderson et al. |
| 7,207,931 B2 | 4/2007 | Boland |
| 7,214,168 B2 | 5/2007 | Rodgers, Jr. |
| 7,244,217 B2 | 7/2007 | Rodgers, Jr. |
| 7,385,324 B2 | 6/2008 | Lin |
| 7,402,915 B2 | 7/2008 | Hutchinson et al. |
| 7,485,073 B2 | 2/2009 | Chang |
| 7,497,807 B2 | 3/2009 | Neff et al. |
| 7,497,808 B2 | 3/2009 | Eschenbach |
| 7,497,812 B2 | 3/2009 | Neff et al. |
| 7,591,763 B1 | 9/2009 | Fucci |
| 7,601,105 B1 | 10/2009 | Gipson, III et al. |
| 7,637,855 B2 | 12/2009 | Bizzell et al. |
| 7,695,410 B2 | 4/2010 | Kim et al. |
| 7,803,094 B1 | 9/2010 | Bolick et al. |
| 7,901,331 B1 | 3/2011 | Stoll |
| 7,988,605 B1 | 8/2011 | Wyeroski |
| 8,485,945 B2 | 7/2013 | Leonhard |
| 8,876,676 B2 | 11/2014 | Lalaoua |
| 9,301,618 B2 * | 4/2016 | Leonhard ................. A47C 7/62 |
| 9,662,531 B2 | 5/2017 | Giannelli et al. |
| 9,713,739 B2 | 7/2017 | Dalmia |
| 10,010,747 B2 | 7/2018 | Campanaro et al. |
| 10,188,890 B2 | 1/2019 | Olson et al. |
| 10,220,246 B2 * | 3/2019 | Lernihan ............ A63B 22/0694 |
| 10,252,102 B2 | 4/2019 | Dalmia |
| 10,350,445 B2 | 7/2019 | Hockridge |
| 10,569,124 B2 | 2/2020 | Dalmia et al. |
| 10,709,932 B2 | 7/2020 | Herring |
| 11,040,238 B2 * | 6/2021 | Colburn ............ A63B 22/0694 |
| 2002/0086779 A1 | 7/2002 | Wilkinson |
| 2002/0160891 A1 | 10/2002 | Gallagher |
| 2003/0036462 A1 | 2/2003 | Ravikumar et al. |
| 2003/0224909 A1 | 12/2003 | Lo et al. |
| 2004/0009848 A1 | 1/2004 | Lee |
| 2005/0009668 A1 | 1/2005 | Savettiere et al. |
| 2005/0014609 A1 | 1/2005 | Neff |
| 2005/0043151 A1 | 2/2005 | Geeting et al. |
| 2005/0221965 A1 | 10/2005 | Boland |
| 2006/0035755 A1 | 2/2006 | Dalebout et al. |
| 2007/0179411 A1 | 8/2007 | Galvez Campos |
| 2007/0219059 A1 | 9/2007 | Schwartz et al. |
| 2008/0015095 A1 | 1/2008 | Savsek et al. |
| 2008/0119333 A1 | 5/2008 | Bowser |
| 2008/0161166 A1 * | 7/2008 | Lo ........................ A63B 22/001 482/52 |
| 2008/0318740 A1 | 12/2008 | Ross et al. |
| 2008/0318743 A1 | 12/2008 | Bizzell et al. |
| 2009/0124463 A1 * | 5/2009 | Chen .................... A63B 22/001 482/52 |

(56) References Cited

U.S. PATENT DOCUMENTS

| | | | |
|---|---|---|---|
| 2009/0291809 A1 | 11/2009 | Chen | |
| 2010/0210425 A1 | 8/2010 | Bowser | |
| 2011/0143884 A1 | 6/2011 | Chu | |
| 2011/0166002 A1 | 7/2011 | Savsek et al. | |
| 2012/0190514 A1 | 7/2012 | Bowser et al. | |
| 2012/0277068 A1 | 11/2012 | Zhou et al. | |
| 2013/0090216 A1 | 4/2013 | Jackson | |
| 2013/0109543 A1 | 5/2013 | Reyes | |
| 2013/0130866 A1 | 5/2013 | Wehrell | |
| 2013/0190139 A1 | 7/2013 | Piaget et al. | |
| 2013/0310225 A1 | 11/2013 | Johnson | |
| 2013/0319808 A1 | 12/2013 | McClure et al. | |
| 2014/0113779 A1 | 4/2014 | Loach | |
| 2014/0274599 A1 | 9/2014 | Chuang et al. | |
| 2014/0274622 A1 | 9/2014 | Leonhard | |
| 2015/0141200 A1 | 5/2015 | Murray et al. | |
| 2015/0202484 A1 | 7/2015 | Lalaoua | |
| 2016/0107026 A1* | 4/2016 | Hsu | A63B 22/0058 482/80 |
| 2016/0121158 A1 | 5/2016 | Chuang et al. | |
| 2016/0317851 A1 | 11/2016 | Toback et al. | |
| 2017/0216660 A1* | 8/2017 | Lernihan | A63B 22/0664 |
| 2017/0216663 A1 | 8/2017 | Giannelli et al. | |
| 2017/0319941 A1 | 11/2017 | Smith et al. | |
| 2018/0169464 A1 | 6/2018 | Janowski | |
| 2020/0289882 A1* | 9/2020 | Pena | A63B 22/0694 |

FOREIGN PATENT DOCUMENTS

| | | |
|---|---|---|
| CN | 103537056 A | 1/2014 |
| CN | 204050832 U | 12/2014 |
| CN | 204380094 U | 6/2015 |
| CN | 106232186 A | 12/2016 |

OTHER PUBLICATIONS

International Search Report and Written Opinion of the International Searching Authority dated Feb. 4, 2016, from Corresponding International Application No. PCT/US2015/059476.
U.S. Office Action dated Sep. 8, 2016 from corresponding U.S. Appl. No. 15/108,077.
U.S. Notice of Allowance dated Mar. 21, 2017 from corresponding U.S. Appl. No. 15/108,077.
U.S. Office Action dated Sep. 14, 2017 from corresponding U.S. Appl. No. 15/657,911.
U.S. Office Action dated Mar. 8, 2018 from corresponding U.S. Appl. No. 15/657,911.
U.S. Notice of Allowance dated May 25, 2018 from corresponding U.S. Appl. No. 15/657,911.
Chinese Office Action dated Dec. 4, 2017 for the Corresponding Chinese Patent Application No. 201580006492.8.
U.S. Notice of Allowance dated May Nov. 28, 2018 from corresponding U.S. Appl. No. 16/141,010.
International Search Report and the Written Opinion of the International Searching Authority dated Aug. 9, 2019 for the Related International Patent Application No. PCT/US2019/028121.
U.S. Notice of Allowance dated Sep. 11, 2019 from corresponding U.S. Appl. No. 16/379,255.
U.S. Office Action dated Nov. 24, 2020 from related U.S. Appl. No. 16/582,407.
Chinese Office Action dated Sep. 7, 2021 for the related Chinese Patent Application No. 201980062964.X.

* cited by examiner

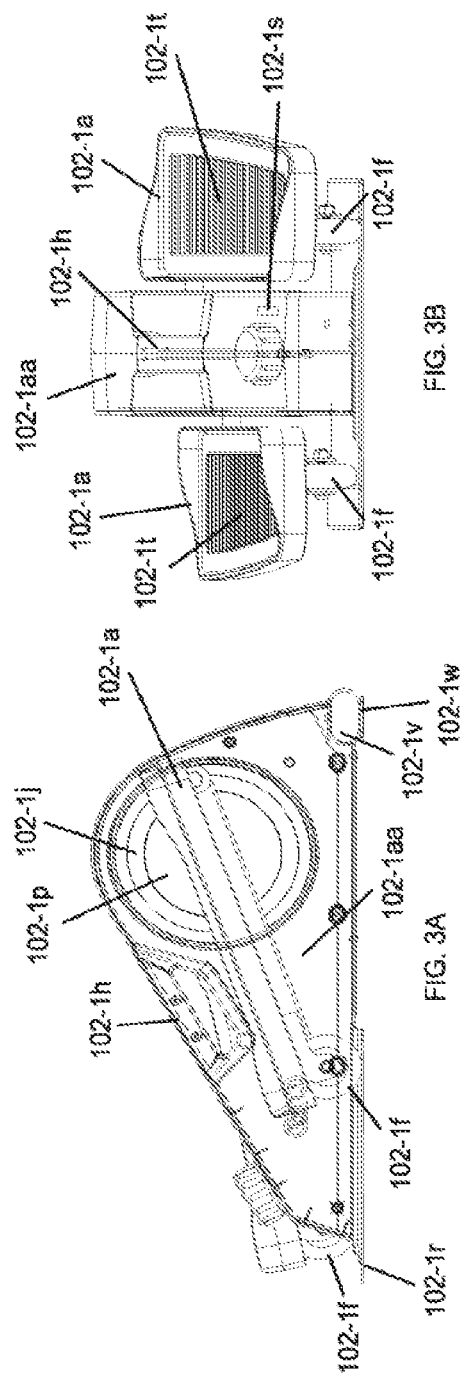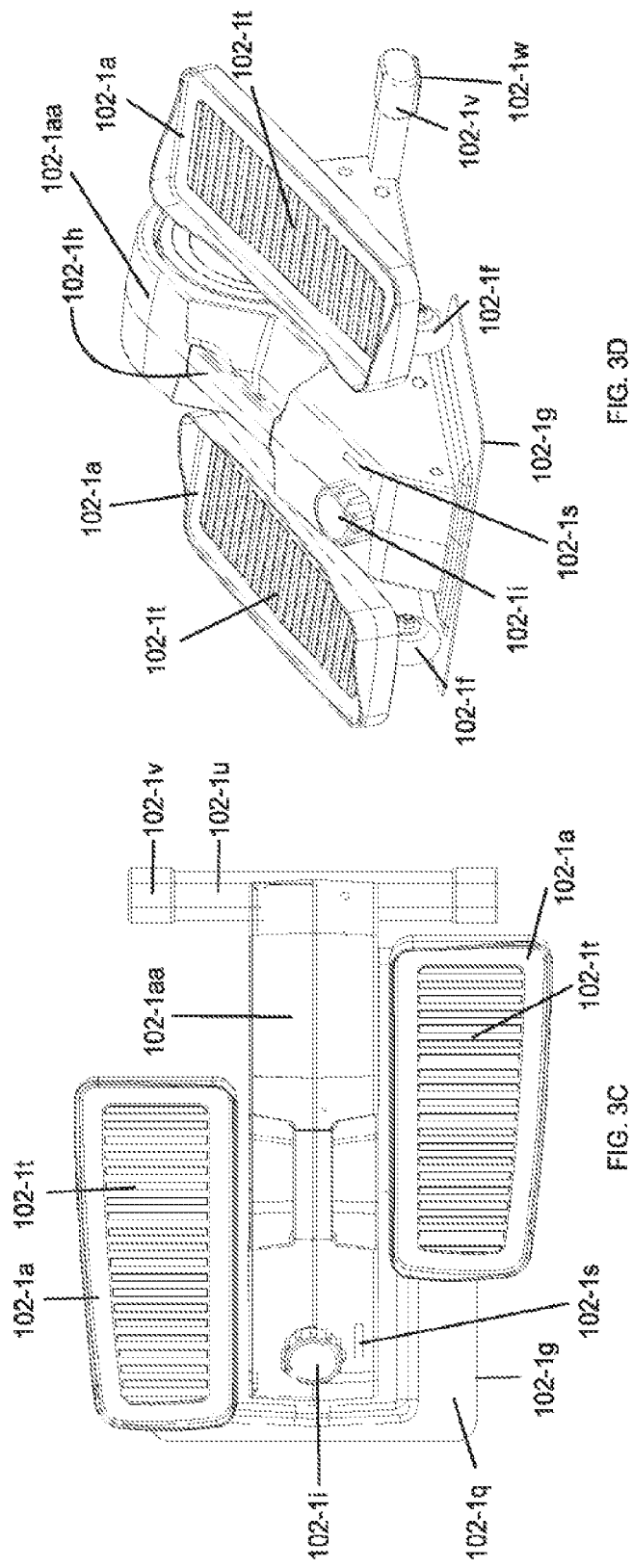

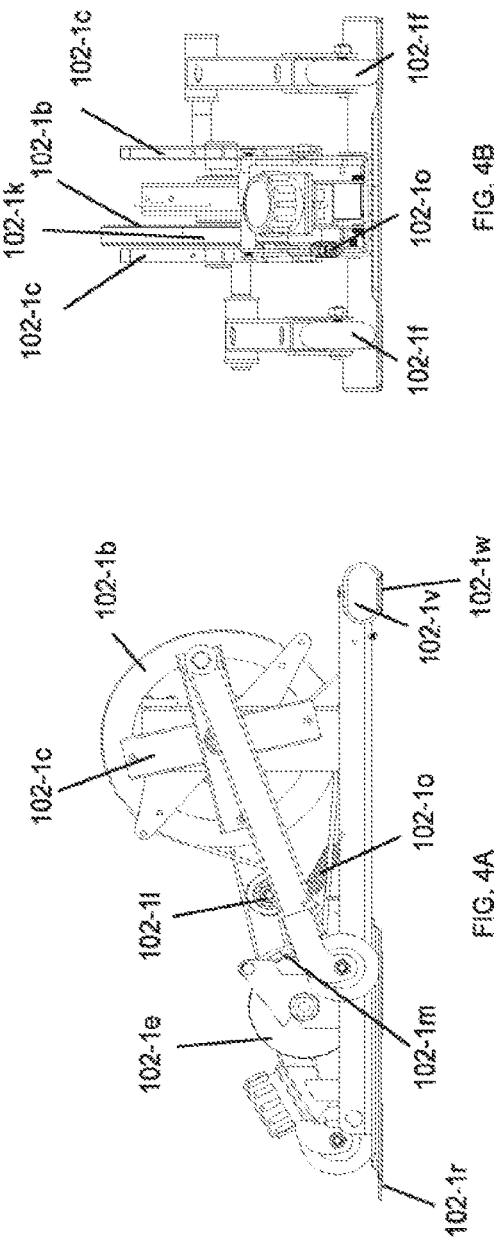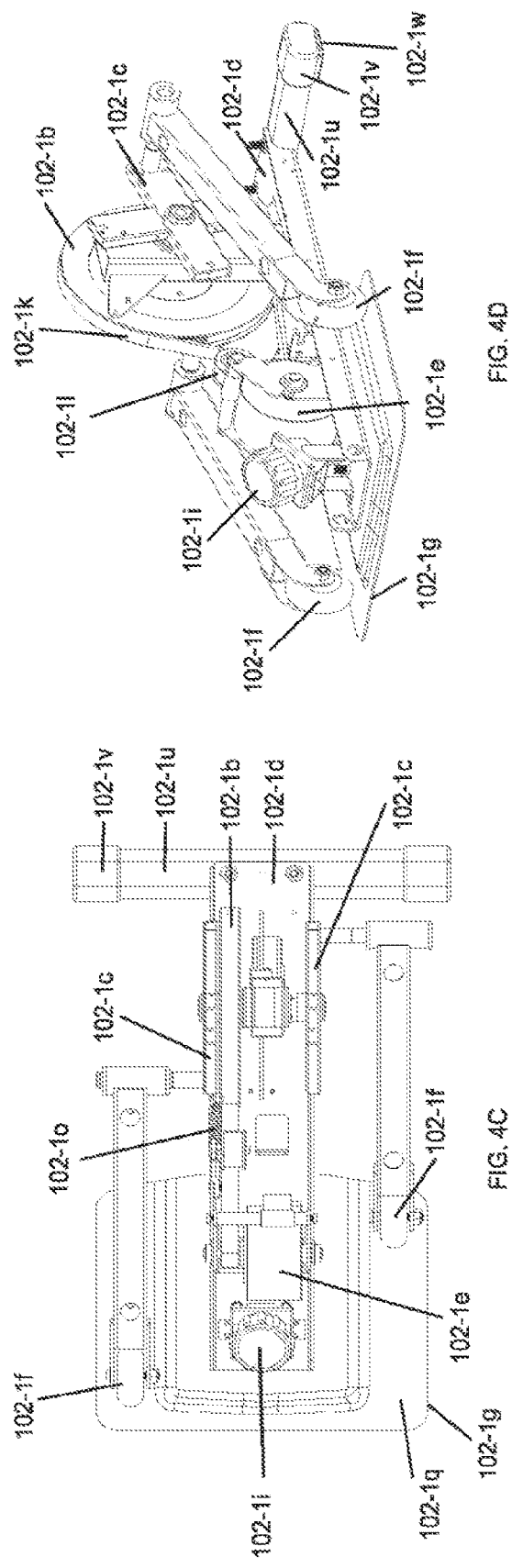

PORTABLE ELLIPTICAL EXERCISE MACHINE AND TRANSPORT MECHANISM

CROSS REFERENCE TO RELATED APPLICATIONS

This application claims priority to U.S. Provisional Application Ser. No. 62/857,117, filed Jun. 4, 2019, the entire content of which is hereby incorporated by reference in its entirety.

This application is also a continuation-in-part of U.S. patent application Ser. No. 16/582,407, filed Sep. 25, 2019; which is a divisional of U.S. patent application Ser. No. 16/379,255, filed Apr. 9, 2019, now U.S. Pat. No. 10,569,124, issued Feb. 25, 2020; which is a continuation-in-part of U.S. patent application Ser. No. 16/141,010, filed Sep. 25, 2018, now U.S. Pat. No. 10,252,102, issued Apr. 9, 2019; which is a continuation-in-part of U.S. patent application Ser. No. 15/657,911, filed Jul. 24, 2017, now U.S. Pat. No. 10,080,918, issued Sep. 25, 2018; which is a continuation of U.S. patent application Ser. No. 15/108,077, filed Jun. 24, 2016, now U.S. Pat. No. 9,713,739, issued Jul. 25, 2017; which is a national stage entry of International Application PCT/US2015/059476, filed Nov. 6, 2015; which claims priority to U.S. Provisional Application Ser. No. 62/077,170, filed Nov. 7, 2014; the contents of which are hereby incorporated by reference in their entirety.

FIELD

The present invention relates to an exercise system. More specifically, the present invention is directed to a portable, low-profile exercise machine incorporating a transport mechanism.

BACKGROUND

Exercise equipment has a long history of development. There have been many proposed machines for simulating physical activities—such as running, cycling, and skiing—or otherwise providing a means for exercising on a stationary apparatus, both for fitness and rehabilitation purposes. Correspondingly, there have been proposed systems for integrating computer technology to these machines for improved exercise programming and performance tracking.

U.S. Pat. No. 3,316,898 describes an exercise machine for legs and hips.

U.S. Pat. No. 3,917,261 describes a foot exercise machine for bedridden patients.

U.S. Pat. Nos. 5,580,337 and 5,904,638 describe a recumbent cycling machine.

U.S. Pat. No. 5,685,804 describes a standing exercise machine that simulates walking jogging, and cross-country skiing.

U.S. Pat. No. 5,860,941 describes an active and continuous passive motion (CPM) device for cycling upper and lower extremities for rehabilitation purposes.

U.S. Pat. No. 5,947,868 describe a recumbent cycling machine with an interface to a computer and/or video game player.

U.S. Pat. No. 6,572,514 describe a spring-loaded foot pedaling machine.

U.S. Pat. No. 6,921,351 describes a stationary cycling machine with an onboard computer and an interface for communicating with external computers and networks.

U.S. Pat. No. 7,485,073 describes a sliding foot/hand exerciser.

U.S. Patent Application Publication No. 2007/0219059 describes a technique for tracking exercises through the use of a mobile monitoring device.

Recent research has suggested that moderate exercise throughout the day can provide additional benefits over merely exercising at the gym for 30 to 60 minutes daily. And in order to address the health concerns presented by the modern sedentary lifestyle, there have been proposed apparatuses for improving the ease and effectiveness of increased exercise throughout a busy work day. In particular, there have been proposed workstations that incorporate elements of an exercise machine and machines dedicated to providing an opportunity for exercise while seated at a work desk.

U.S. Pat. Nos. 7,497,807 and 7,497,812 describe a stationary cycling assembly for attachment to an underside of a desk and a computer for displaying a virtual exercise environment on the desk.

U.S. Pat. No. 7,695,410 describes a cycling apparatus that is mountable to a work chair at a desk.

U.S. Pat. No. 7,901,331 describes an elliptical exercise machine that is usable while seated on a chair.

U.S. Pat. No. 8,485,945 describes an exercise workstation that includes a table assembly having a working surface, and an elliptical trainer.

U.S. Patent Application Publication No. 2007/0179411 describes a portable sliding, stepping, and pedaling machine for seated exercise.

U.S. Patent Application Publication No. 2003/0036462 describes an active/passive foot pedaling machine that is usable while seated on a chair.

U.S. Patent Application Publication No. 2004/0009848 describes a portable cycling device that is usable while seated at a desk.

U.S. Patent Application Publication No. 2005/0014609 describes a stationary cycling assembly for attachment to an underside of a desk.

U.S. Patent Application Publication No. 2014/0274622 describes a connector for coupling an exercise device to a five-leg chair.

SUMMARY

In view of the above, it is an object of the invention to provide an improved exercise apparatus that is portable and conveniently usable while being seated at a desk. It is an additional object of the invention to provide a portable machine that is non-intrusive to a workspace and that, nevertheless, enables a smooth and genuinely elliptical motion, with optimal foot angles to prevent any distraction from regular work. With this in mind, the present invention is directed to an exercise apparatus that comprises a pulley; a pair of stabilizing assemblies each configured to couple a respective front portion of a pedal element to each side of said pulley; a looped belt configured to couple the pulley to a resistance assembly; a tension stabilizer configured to maintain a tension of the looped belt on the pulley; and the resistance assembly configured to assert an adjustable resistance to the pedal elements by adjusting a magnetic force on the looped belt, wherein the magnetic force is adjusted by changing a distance between the flywheel and magnetic plate of the resistance assembly.

In accordance with an embodiment of the present invention, an exercise system incorporates a resistance band extension that can be used to perform upper body exercises, such as bicep curls, while simultaneously pedaling on the portable elliptical exercise machine.

In accordance with an embodiment of the present invention, an exercise system incorporates an extendable transport mechanism enabling the portable elliptical exercise machine to be conveyed.

In accordance with an embodiment of the present invention, an exercise system incorporates an exercise device, mobile device, central system and a user engagement platform for monitoring user exercise activity.

In accordance with an embodiment of the present invention, an exercise system comprises an exercise device including a wireless transceiver configured to wirelessly communicate data associated with exercise activity to a mobile device.

In accordance with an embodiment of the present invention, the exercise system comprises a central system configured to receive exercise activity from the mobile device.

In accordance with an embodiment of the present invention, the exercise system comprises a transport mechanism.

An exercise system including an exercise device having memory and a processor and computer program steps stored in the memory and configured to be executed by the processor, the computer program steps comprising: sensing rotations of a mechanical component of exercise device; transmitting data associated with the rotations of the mechanical component; and calculating data associated with exercise activity of the user.

BRIEF DESCRIPTION OF DRAWINGS

FIGS. 3A-D depict perspective views of the exercise device shown in FIG. 1.

FIGS. 4A-D depict perspective views of the exercise device shown in FIG. 1 with the housing removed to illustrate the internal arrangement of its mechanical components.

DETAILED DESCRIPTION

Figure 1:
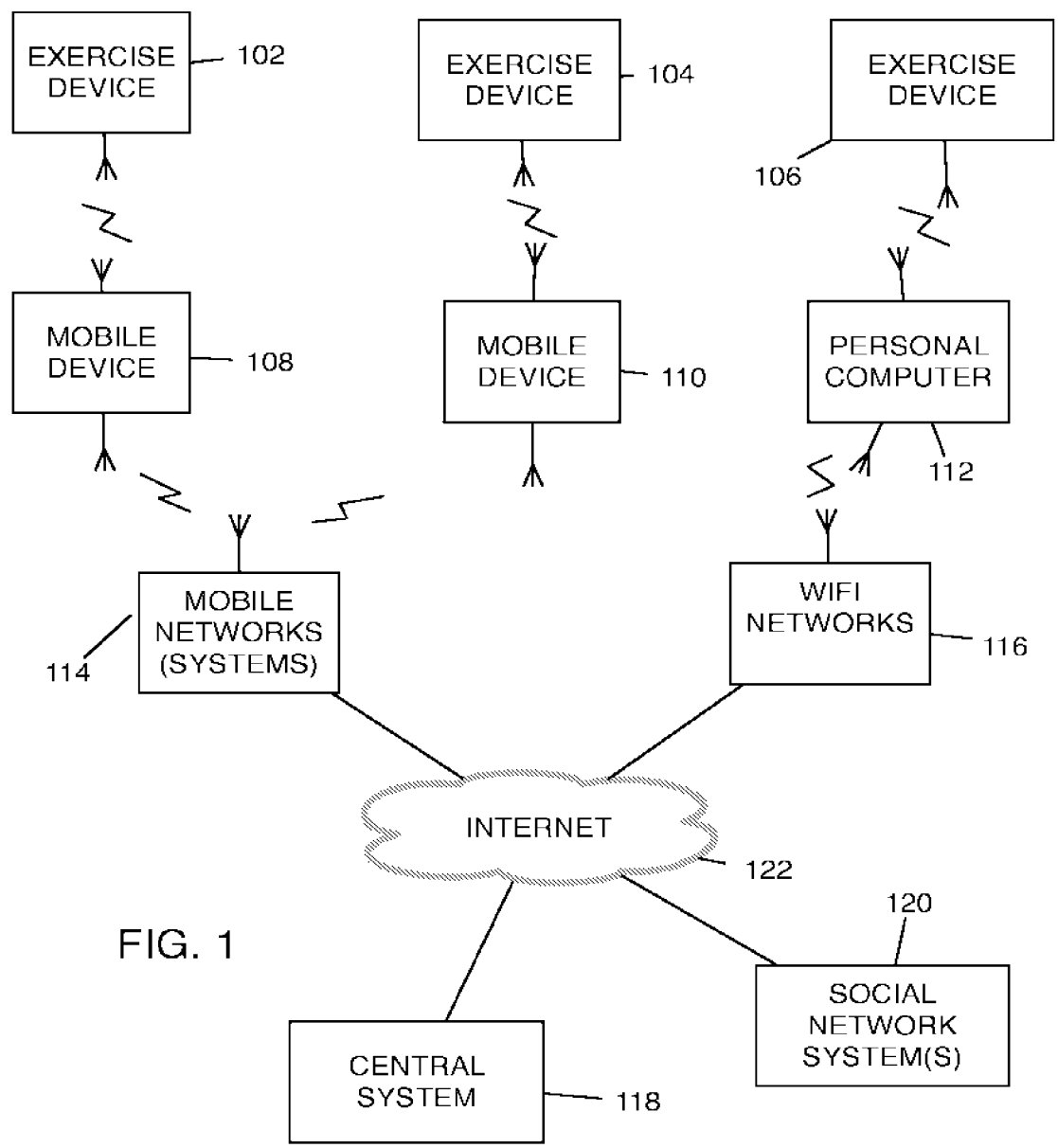
FIG. 1 depicts a block diagram of an example exercise system.

FIG. 1 depicts a block of an example exercise system 100 that includes several exercise devices 102, 104, 106, mobile devices 108, 110 and personal computer 112, wireless networks such as mobile networks 114 and WIFI networks 116, central system 118 and content providers such as social networks 120. Exercise system 100 incorporates a platform for monitoring user exercise activity.

Mobile devices 102, 104 and personal computer 112 are connected to central system 118 and social networks 120 (any content provider) via a communication network such as Internet 122 as known to those skilled in the art. Users may use mobile devices 102, 104 or personal computer 112 to access applications and information locally within the devices and personal computer, respectively or remotely from central system 118 (or any content provider) via a web browser or stand alone application on mobile devices 108, 110 or personal computer 112 as known to those skilled in the art (as described in more detail below).

Each exercise device 102, 104, 106 is used by a user to address the problem of sedentary behavior in the workplace. As disclosed in more detail below, each exercise devices 102, 104, 106 is an elliptical trainer that is configured for use under a desk. Specifically, the elliptical trainer is positioned on the floor under a user's desk. The user will pedal the footpads while working at his/her desk. Details of this elliptical trainer are described below. While an elliptical trainer is disclosed, those skilled in the art know that other exercise devices may be used to achieve the same results. Exercise devices 102, 104 may communicate with mobile devices 102, 104 wirelessly or by wired connection. In a wireless configuration, an exercise device may connect to mobile device by way of Bluetooth or other wireless communication protocols known to those skilled in the art. In a wired configuration, a mobile device may connect by wire to respective ports on the devices. This is described in more detail below.

Examples of mobile devices 108, 110 as described herein include smartphones (e.g., iPhones, Android phones), cell phones, tablets (e.g. iPads), laptop, PDAs and other devices. Personal computer is a desktop computer as known to those skilled in the art. Mobile devices 108, 110 will enable a user to communicate wirelessly with and access content from central system 118 or other systems if desired, over Internet 120 through mobile networks 114 (e.g., Verizon, Sprint, T-Mobile and AT&T) or available WIFI networks 116). Personal computer 112 also enables a user to communicate with central system 118 (or other system) over Internet 120 via cable, ISDN, WIFI or wireless carrier. (Two mobile devices and one personal computer are shown for illustrative purposes, but those skilled in the art know that any number of mobile devices or personal computers may be used for any number of clients and counselors (users). Central system 118 is configured to facilitate the provision of targeted content from content providers such as social networking systems 120 to users via mobile devices 108, 110 and/or personal computer 112. In accordance with an embodiment of the invention, exercise devices 102-106 may directly communicate with a network—for example, WIFI networks 116.

As described in more detail below, central system 118 includes one or more servers including a web server. Each server includes several internal components, databases, software modules and applications as known to those skilled in the art. This is described in more detail below. System 10 is used to implement the application processes discussed herein.

Figure 2:
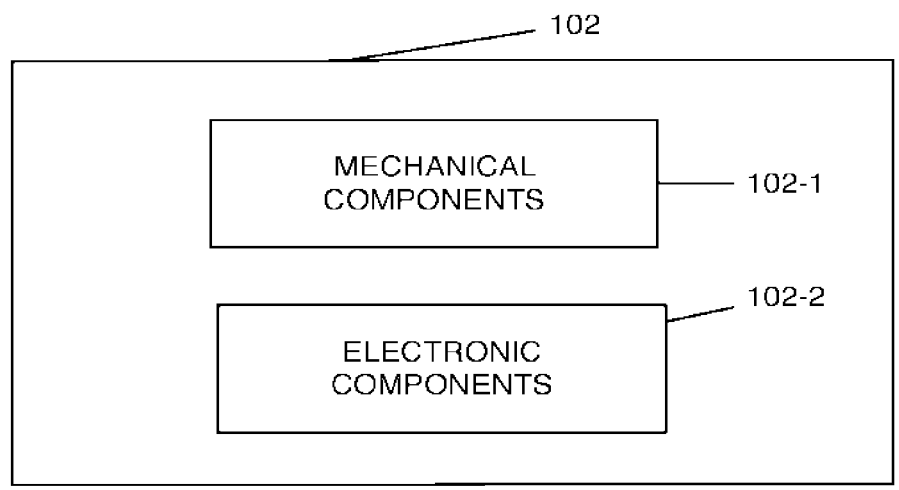
FIG. 2 depicts a block diagram of the exercise device shown in FIG. 1.

Reference is now made to FIGS. 2-4. FIG. 2 depicts a high-level block diagram of the exercise device 102 (example) shown in FIG. 1. In particular, exercise device 102 comprises mechanical components 102-1 that perform the basic operation of exercise functions and electronic components 102-2 that performs several functions including monitoring mechanical movement of certain mechanical components 102-1, converts mechanical movement into an electronic signal/data and transmits this data to a mobile device. Electronic components 102-2 also function to convert the mechanical movement into energy that is stored and subsequently used to charge the battery of a mobile device.

FIGS. 3A-D depict perspective views of the exercise device shown in FIG. 1. In particular, exercise device 102 (example) is an elliptical trainer and its mechanical components 102-1 include pedals/footpads 102-1a that each engage a user's foot. As shown in FIGS. 3A-D, the pedals 102-1a are each coupled to a circular rotation assembly—which will be described in further detail below with FIGS. 4A-D—on a front (or toe) end. And the pedals 102-1a each incorporate wheels 102-1f positioned on the opposite back (or heel) end for a sliding motion on a base plate 102-1g. In accordance with an exemplary embodiment of the invention, the base plate 102-1g may be made with a metallic or composite material coupled to a metallic (or composite) frame (main chassis) 102-1d of the exercise device and may comprise a silicone pad 102-1q on a top side for friction and noise reduction on the contact with the wheels 102-1f as they travel back and forth. The base plate 102-1g may also incorporate a polymer material 102-1r, such as Ethylene-vinyl acetate (EVA), on its underside to increase traction between the base plate and the floor—thus preventing the exercise device from slipping during use. With the combination of the circular motion on front (toe) end and a sliding motion on the back (heel) end, the pedals 102-1a provide an effective elliptical motion for a user's feet and legs, thus enabling a cardiovascular exercise that reduces stress on the user's joints. In addition, the pedals 102-1a—and thus, the elliptical motion—are angled to allow use in a seated position. And comfort mats, which may be composed of silicone material and the like, 102-1t may be placed on pedals 102-1a. The elliptical motion also reduces the vertical profile of the user's leg movement, thus allowing the exercise device to be used under a desk while preventing the user's knees from being obstructed by the underside of the desk through the elliptical motion. According to an exemplary embodiment of the invention, the exercise device may also incorporate a handle 102-1h that is centrally positioned on its top side such that a user may conveniently carry, move, place, and adjust the exercise device. Thus, the exercise device according to the present invention is a portable, low profile apparatus that allows an angled elliptical exercise for a user in a seated position—for example, while seated at a work desk and the like. In accordance with an exemplary embodiment of the invention, the housing 102-1aa of the exercise device may include a display screen 102-1s configured to display a user-interface for interacting with a software program in connection with the operation of the exercise device, such as activity tracking, exercise programming, etc. For balanced support and stability of the exercise device, the main chassis 102-1d may incorporate a chassis front bar 102-1u with end caps 102-1v, which may be composed of composite material and the like, on opposing ends thereof. Similar to the base plate 102-1g, the end caps 102-1v may each comprise a polymer material 102-1w, such as Ethylene-vinyl acetate (EVA), on its underside to increase traction with the floor—thus preventing the exercise device from slipping during use.

FIGS. 4A-D are perspective views of the exercise device corresponding to FIGS. 3A-D with the housing 102-1aa removed to illustrate the internal arrangement of the mechanical components 102-1. As shown in FIGS. 4A-D, a pulley 102-1b and rotary stabilizers 102-1c form the internal circular rotation assembly coupled to the front (toe) ends of pedals 102-1a for providing a circular motion, as described above with reference to FIGS. 3A-D. According to an exemplary embodiment of the invention, pulley 102-1b and stabilizers 102-1c are coupled to an anchoring pillar component of base frame (or main chassis) 102-1d of the exercise device on a common rotary axis. Stabilizers 102-1c provide support for disc rings 102-1j and cover discs 102-1p, shown in FIGS. 3A and 3D, for covering the circular rotation assembly within the housing of the exercise device. Stabilizers 102-1c also provide additional mass to the circular rotation assembly so that sufficient inertia is generated—with the rotation of the pulley 102-1b and stabilizers 102-1c—to ensure stability of the exercise device during use. In particular, the added inertia of stabilizers 102-1c allows the use of a smaller flywheel 102-1e while maintaining stability in the overall system—and, thus, reducing the vertical profile of the exercise device at the front end of the device where the user's legs are placed—to fit the exercise device under a desk. The stabilizers 102-1c further provide weight balance for the exercise device such that the handle 102-1h gives the user a grasp on the center of balance of the exercise device while carrying/moving the device. As described above, foot pedals 102-1a are configured to an angle to optimize the user's foot motion for seated exercise. And as shown in FIGS. 4A-D, pedals 102-1a may be supported by a shaft that connects stabilizers 102-1c and wheels 102-1f in such an angle. The exercise device, thus, provides for ideal foot angles for seated exercise through an elliptical motion—the foot pedal angles ranging between approximately 2° and 32° from horizontal.

In accordance with an exemplary embodiment of the invention, the pulley 102-1b may have a diameter of approximately 196 mm (thus also defining a rotational diameter), thickness of approximately 20 mm, and mass of approximately 314 g. And as shown in FIGS. 4A-D, the stabilizers 102-1c may be embodied by a cross-shaped structure (or cross-bar) that measures approximately 150 mm in length/rotational diameter and 670 g in mass.

The Exercise device further comprises resistive components, which may embody a magnetic flywheel 102-1e, that provide resistance to the pulley 102-1b. According to an exemplary embodiment of the invention, the resistive components may include a magnetic system that controls a resistance of the pulley 102-1b—and thus, the pedals 102-1a—by controlling a distance between a magnetic plate 102-1m and the flywheel element 102-1e. The flywheel element 102-1e may have a magnetic property so that a decreased distance from the magnetic plate 102-1m would increase resistance (by a magnetic force asserted by the magnetic plate 102-1m over the adjustable distance on the flywheel 102-1e) and, thus, the inertia needed to rotate the flywheel 102-1e. And the looped belt 102-1k loops around a co-rotating extension 102-1n from the flywheel 102-1e such that the resistance on the flywheel 102-1e is translated to the looped belt 102-1k, which is, in turn, translated to pulley 102-1b on the other end of looped belt 102-1k. The distance between the flywheel 102-1e and its corresponding magnetic plate 102-1m may be set and altered between approximately 3 mm (maximum resistance) and approximately 17 mm (minimum resistance). A tension adjuster/control dial 102-1i may be provided for the user to adjust this distance and, hence, to control the resistive components 102-1e and 102-1m in order to alter the resistance of the exercise device. In addition, a tension component (e.g., roller 102-1l) may also be provided to maintain tension of the belt 102-1k around the pulley 102-1b and the extension 102-1n from flywheel 102-1e, especially during changes in resistance, to maintain smooth motion of the exercise device. As shown in FIGS. 4A-D, the tension component 102-1l may be embodied by a roller coupled to the base frame 102-1d of the exercise device via a spring element 102-1o to assert a tension on magnetic belt 102-1k.

In accordance with an exemplary embodiment of the invention, the flywheel element of the resistive components 102-1e may have a diameter of approximately 95 mm, thickness of approximately 50 mm, and mass of approximately 2.5 kg. The tension spring component 102-1o coupled to the roller 102-1l may have an adjustable length between approximately 65 and 76 mm. And the roller 102-1l may have a diameter of approximately 34 mm, thickness of approximately 25 mm, and mass of approximately 50 g.

The mechanical components 102-1 may optionally include vibration mechanical components within the pedals/footpads 102-1 a. These footpads may also include electronic components for the vibration components and heating as well as described below.

In accordance with an alternative embodiment of the invention, control dial 102-1i may be replaced by or augmented with on-board electronic display and/or controls (not shown) and/or wireless electronic components that provide remote control of the exercise device—for example, on/off, activity tracking, resistance, pre-programmed activities/intervals, etc.

Figure 5:
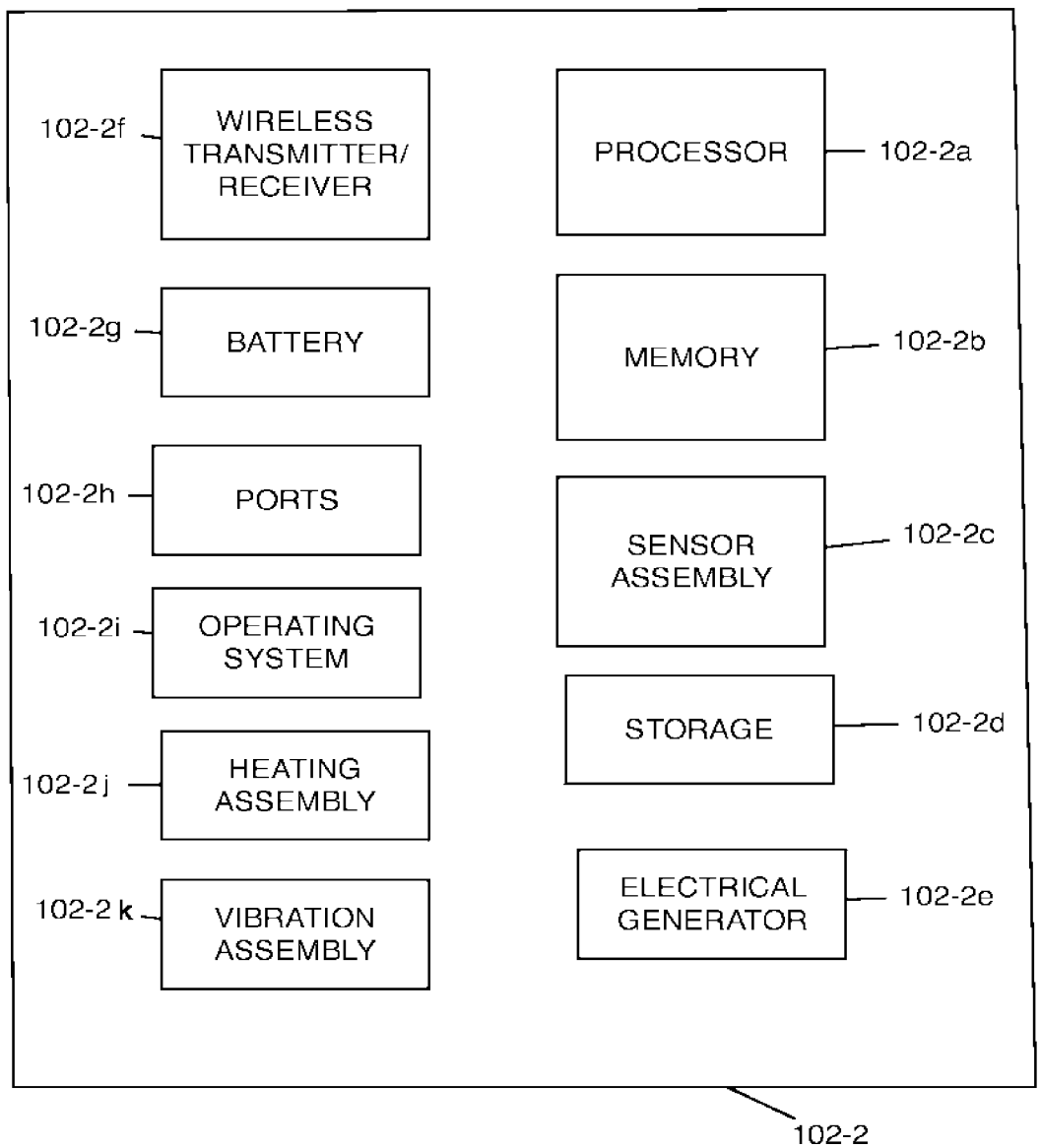
FIG. 5 depicts a block diagram of example electronic components in the exercise device shown in FIG. 2.

FIG. 5 depicts a block diagram of example electronic components 102-2 in the exercise device shown in FIG. 2. In one embodiment in particular, electronic components include processor 102-2a, memory 102-2b, sensor assembly 102-2c, storage device 102d, electrical generator 102-2e, wireless transmitter/receiver 102-2f, battery 102-2g, ports 102-2h and OS 102-2i.

Processor 102-2a processes for executing commands and for storing and retrieving data from memory 102-2b as well as storage device 102-2d.

Memory 102-2b is used for retaining and information on a short-term basis when memory 102-2b is powered. Memory 102-2b may be RAM, but it may be any other volatile storage unit. The contents of memory 102-2b are accessible to processor 102-2a. The memory 102-2b may also include instructions for execution by processor 102-2a (it will run an operating system and possibly one or more application platforms including a part of the user engagement platform for monitoring user exercise activity disclosed herein.)

Sensor assembly 102-2c incorporates one or more sensors that are used to sense rotational movement of the pulley 102-1b. In one embodiment, processor 102-2a calculates frequency based on the sensed signals and subsequently stores and transmits such frequency to a mobile device or personal computer. In another embodiment, the frequency may be calculated in the mobile device or personal computer.

Storage device 102-2d is used for storing data and applications including the operating system and a part of the user engagement platform for monitoring user exercise activity disclosed herein.

Electrical generator 102-2e generates current (i.e., power/energy) from the movement of the mechanical components (pedals, pulley etc.). A Dynamo is an example of such an electrical generator. The dynamo converts mechanical energy into electricity that is stored in battery 102-2g. A wire may connect battery 102-2g with a mobile device by way of a USB port on the elliptical trainer. The ability to charge a mobile device is an incentive for users to exercise. According to an embodiment of the invention, electrical generator 102-2e may be integrated with the resistive components 102-1e so that energy from added resistance may be utilized in charging battery 102-2g and/or a mobile device.

Wireless transmitter/receiver 102-2f (transceiver) is used to enable the elliptical trainer to communicate wirelessly with a mobile device, a personal computer, or a wireless gateway to a network. Wireless transmitter/receiver 102-2f enables two-way communication. As indicated above, the elliptical trainer may communicate wirelessly by means of Bluetooth or other wireless protocol. Data associated with user exercise activity may be transmitted to a mobile device. Alternatively, data and instructions may be transmitted from the mobile device to the elliptical trainer. For example, the mobile device may be configured to transmit electronic control instructions to the elliptical trainer to control the resistance of the pulley (and hence pedals) to increase the resistance for the user. Mobile device may transmit preprogrammed workouts to the elliptical trainer.

Battery 102-2g is an energy storage device for storing the current (i.e., power/energy) generated by mechanical components 102-1 (e.g., pedals and pulley). In accordance with an exemplary embodiment of the invention, control instructions with respect to the battery 102-2g may also be received by the transceiver 102-2f from a mobile device, computer, network, or the like.

One or more hardware ports 102-2h may be provided for interfacing with external devices. For example, one or more ports are used to enable wired connection between the elliptical trainer and a mobile device and/or a personal computer. A USB is an example of one such port.

The operating system (OS) may be a Windows based or a variant of another operating system, such as Apple OS, Linux, and the like.

Some or all of the electronic components 102-2 may be embedded on a PC board. Further, an Arduino with Bluetooth 4.0 controller board is an example of a PC board that performs the functions of many of the components including the sensor assembly and wireless transmitter/receiver 102-2f. The Arduino typically also includes a microcontroller. In this embodiment, the Arduino with Bluetooth enables the elliptical trainer to sense and transmit the number of rotations (signals) directly to other Bluetooth enabled devices such as a mobile device or personal computer. In this respect, a separate processor, memory storage and OS may not be needed.

Electronic components 102-2 may optionally include a heating assembly 102-2j and/or vibration assembly 102-2k. Heating assembly 102-2j may include the proper wiring and heating elements to heat the footpad/pedals 102-1 *a* while a user exercises. Vibration assembly 102-2*k* may incorporate the proper wiring and electronics to cause the vibration (mechanical) components to vibrate in the footpad/pedals 102-1*a* of the elliptical trainer.

Figure 6:
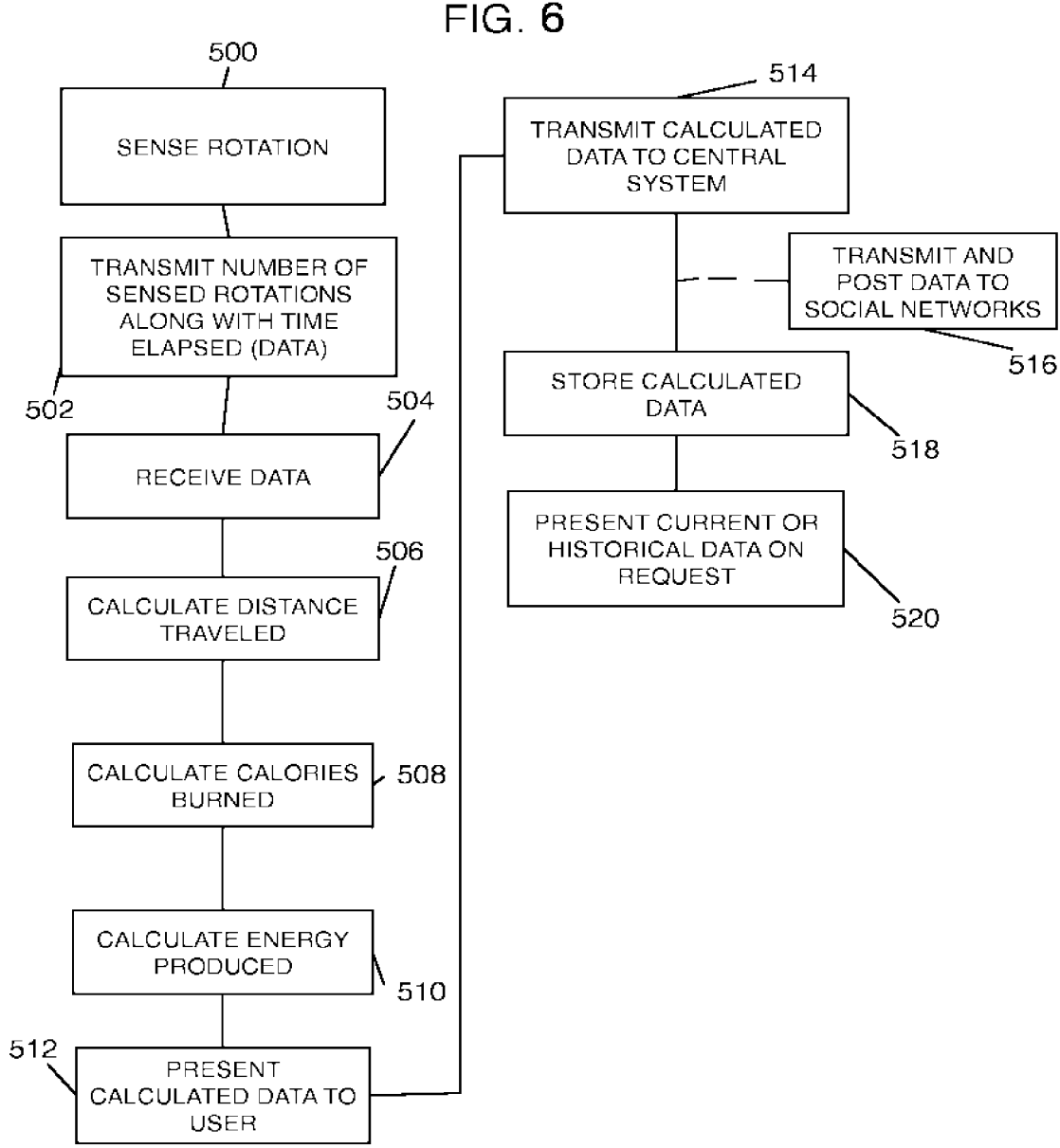
FIG. 6 is a flowchart of example high-level steps of an application process for a user engagement platform for monitoring user exercise activity.

FIG. 6 is a flowchart of example high-level steps of an application process for the providing a user engagement platform for monitoring user exercise activity. The platform is described and shown as steps applied across and through the exercise device 102 (for example), mobile device 108 (for example) and central system 118.

In particular, execution begins at steps 500 and 502 wherein pedal rotations are sensed (rotation is monitored) by sensing assembly 102-2*c* and then transmitted along with time elapsed by wireless transmitter/receiver 102-2*h* to a mobile device (or personal computer) by Bluetooth or other wireless protocols. In addition, resistance level of the pulley is also sensed and transmitted. As part of these steps, the sensed signals may be stored in memory 102-2*b* and processed locally by processor 102-2*a* or transmitted immediately (real time) or periodically, per interval (without processing) to a mobile device or personal computer. (Processing may involve calculating distance and other parameters as described below.) Regardless whether the data is stored and processed locally or remotely, the data is transmitted in real time to enable a user to monitor or track his/her exercise activity.

Execution then moves to step 504 wherein a mobile device 108 (for example) receives the rotation data. (In this embodiment, the data is raw data and it is stored.) A user may establish an account, wherein the user can access his/her exercise activity in accordance with this embodiment.

Execution then moves to steps 506, 508, 510 wherein exercise data parameters (also called exercise activity) are calculated such as distance, calories burned and amount of energy produced by the user. In addition, other exercise data parameters may be calculated and displayed including calories per unit distance and per rotation as well as energy generated per unit distance and per rotation. At step 512, the calculated parameters are presented (displayed) to the user, automatically or upon request through a standalone application or browser on a mobile device 108 or personal computer 112 and subsequently stored on the mobile device 108 or personal computer 112. Execution then moves to step (also called cloud) wherein the calculated data parameters are transmitted to central system 118 for storage, historical tracking and viewing.

Execution may move to step 516 wherein the calculated exercise activity is transmitted and posted, at the user's request, to a social networking website such as Facebook and/or transmitted to gaming consoles such as Nintendo Wii, Microsoft Xbox, Kinect or Oculus Rift. In this case, the user can share and compare stats within a community of authorized users. (Data from other known fitness tracking apps such as Fitbit, Jawbone, etc. may be captured here as well.) The exercise activity posted via Facebook or gaming consoles provides greater motivation for a user to continue exercise activity.

Execution then moves to step 518 wherein the exercise activity is stored. Execution then moves to step 520 wherein single or multiple user exercise activity (current or historical) is presented for viewing by an administrator or other user at their request. In this respect, a user can track performance on individual accounts (or in aggregate as described below) and update and message all users directly.

A cloud database within central system 118 aggregates user data such as calories burned, distance traveled and elapsed time from multiple individual accounts to form larger pools of data categorized by population factors such as organization (e.g. corporate employer, student clubs, interest groups, universities), cities, countries, continents and other demographic indicators. A mobile interface displays rankings between different populations based on collective sums of data including calories burned, distance traveled and elapsed time. For example, Facebook employees could compare their own company-wide stats with Google, Amazon and Yahoo and use as a friendly competition if desired.

While the process steps are described in the order above, those skilled in the art know that the order may be changed or steps may be added or deleted to achieve the desired outcome as described.

Figure 7:
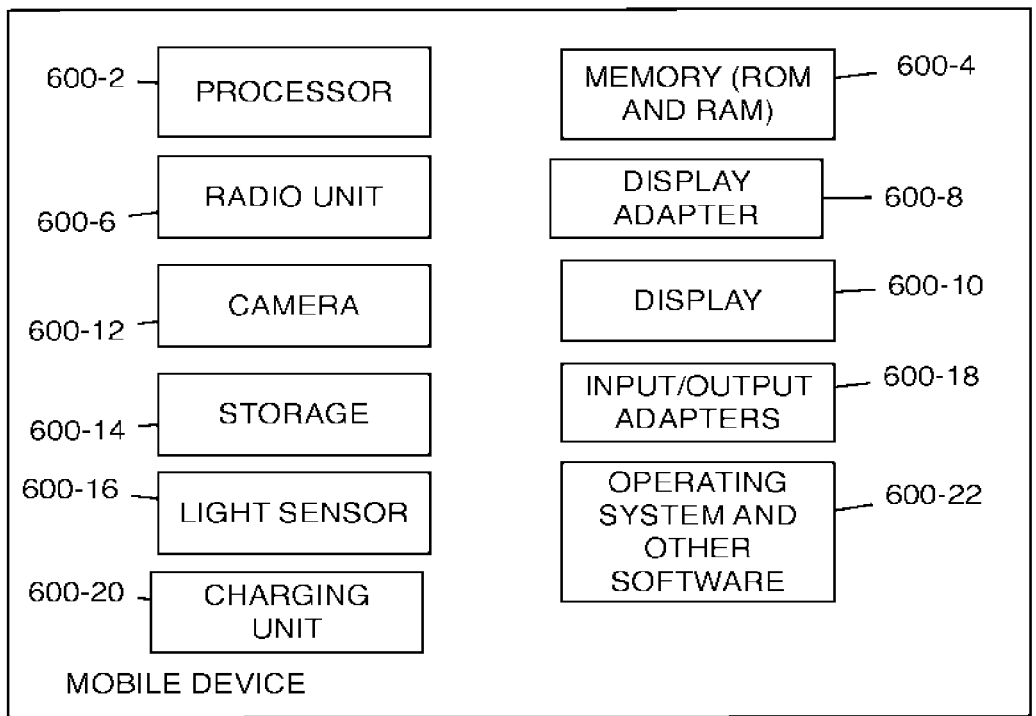
FIG. 7 depicts a block diagram of example components within a mobile device.

FIG. 7 depicts a block diagram of the components within mobile devices 600. Mobile device 600 is an example of mobile devices 108, 110 shown in FIG. 1. Mobile device 600 includes the same components as mobile devices 108, 110. Mobile device 600 preferably incorporates similar components as a personal computer (described below) including a processor, memory, storage and interface devices. In particular, mobile device 600 incorporates processor 600-2 configured to execute instructions and control other components of mobile device 600 in accordance with such instructions. Mobile device 600 further includes memory 600-4 for storing instructions including volatile and non-volatile memory such as random access memory and read only memory (RAM and ROM).

Mobile device 600 may communicate by wire or wireless means. Wireless communication is achieved by way of radio unit 600-6. Radio unit 600-6 is configured to communicate using radio frequency transmission. Radio unit 600-6 incorporates cellular, WIFI and Bluetooth transceivers for communication. Mobile device 600 may include a global positioning system (GPS) or such services may be performed using an application for GPS. Mobile device 600 also includes display adapter 600-8 and it is configured to control a display for conveying application process and various activity information, alerts, notifications and the like. Display adapter 600-8 communicates with a display 600-10 and camera 600-12. Mobile device 600 also includes storage 600-14 for storing data and programs, and light sensor 600-16 used to determine a level of brightness for the display for viewing. Mobile device 600 may optionally include input/output adapters 600-18. Mobile device 600 also includes a charging unit 600-20 for powering device 600. An accelerometer may optionally be incorporated for detecting movement of mobile device 600. Mobile device 600 may include other sensors. Mobile device 600 also includes an operating system 600-22 such as iOS, Android or Microsoft Windows Mobile along with other applications including Java etc.

Figure 8:
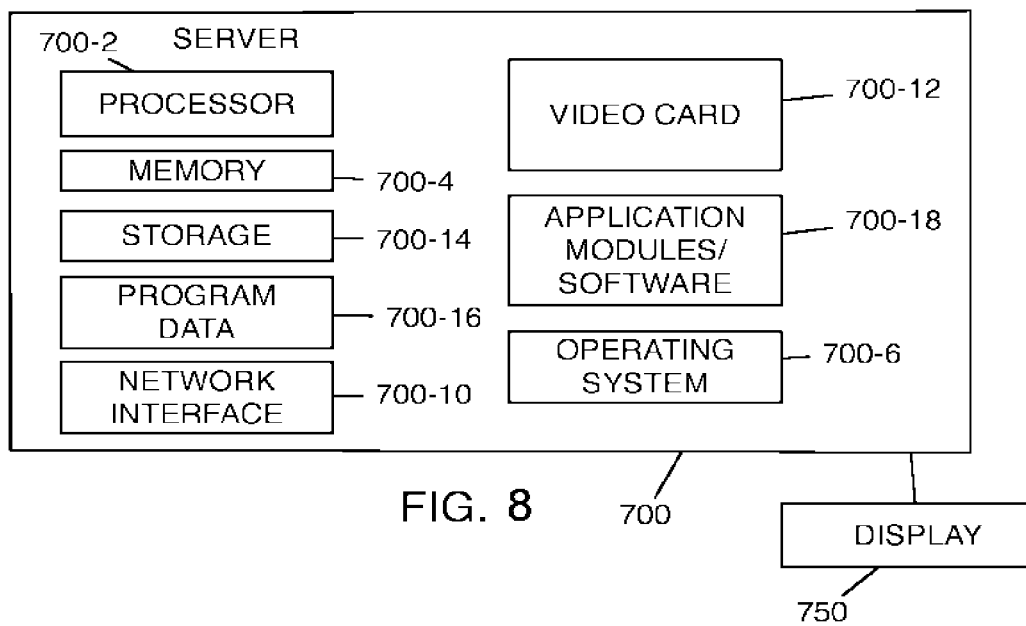
FIG. 8 depicts a general-purpose computer to support the embodiments of the computer-implemented systems and methods including computer components disclosed in this application.

FIG. 8 depicts a block diagram of a general-purpose computer to support the embodiments of the computer-implemented systems and methods disclosed herein. In a particular configuration, the computer 700 may be a computer server as described above with respect to central system 118 or personal computer. (Central system 118 is configured to enable part or all of the process steps of the application (software) in the embodiments described herein. The computer 700 typically includes at least one processor 700-2 and system memory 700-4 (volatile RAM or non-volatile ROM). System memory 700-4 is coupled to and its stored contents are accessible to the processor 700-2. In operation, the memory 700-4 may also include instructions from processor 700-2, an operating system 700-6 and one or more application platforms 700-8 such as Java and a part of a software component or one or more software components/applications 700-18. The computer may include one or more communication connections such as network interfaces 700-10 to enable the computer to communication with other computers over a network, storage 700-14 such as a hard drives for storing data 700-16 and other software described above, video cards 700-12 and other components. This computer 700 typically runs Unix or Microsoft as the operating system and include TCP/IP protocol stack for communication over the Internet. A display 750 is optionally used.

Figure 9:
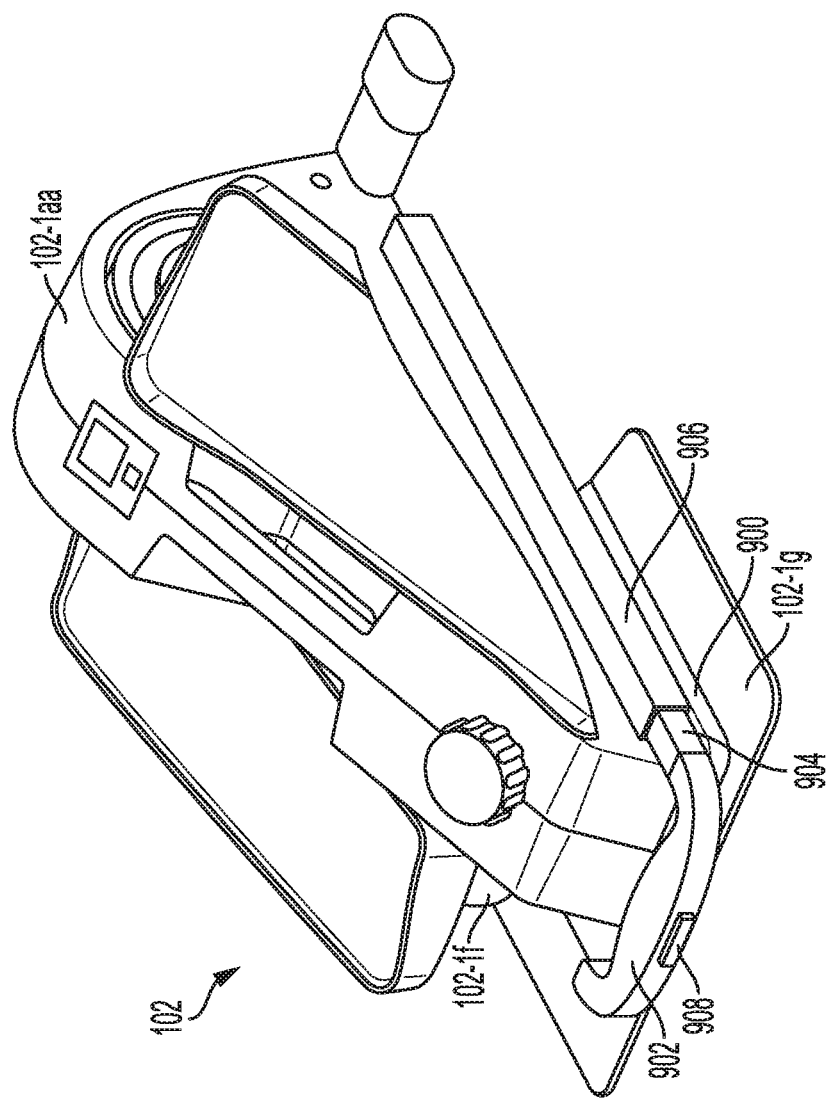
FIG. 9 depicts a transport mechanism in a closed position incorporated into the exercise device.

FIG. 9 depicts a view of the transport mechanism 900 which is coupled to base plate 102-1g of exercise device 102. Generally, transport mechanism 900 comprises handle 902, telescoping tube 904, and mounting structure 906. A button 908, located on handle 902, is used to lock transport mechanism 900 between an extended position (FIG. 10) and a closed position (FIG. 9). When transport mechanism 900 is in the closed or open position, handle 902 can be utilized by a user to easily transport exercise device 102 to various locations.

Preferably, mounting structure 906 is a tubular structure, like telescoping tube 904, capable of slidingly receiving telescoping tube 904. The mounting structure 906 is preferably mounted to base plate 102-1g adjacent housing 102-1aa and does not extend beyond wheels 102-1f so as not to interfere with exercise device 102. In the view of FIG. 9, the right pedal and wheel 102-1f are not shown to demonstrate how transport mechanism 900 is attached to base plate 102-1g adjacent housing 102-1aa.

Figure 10:
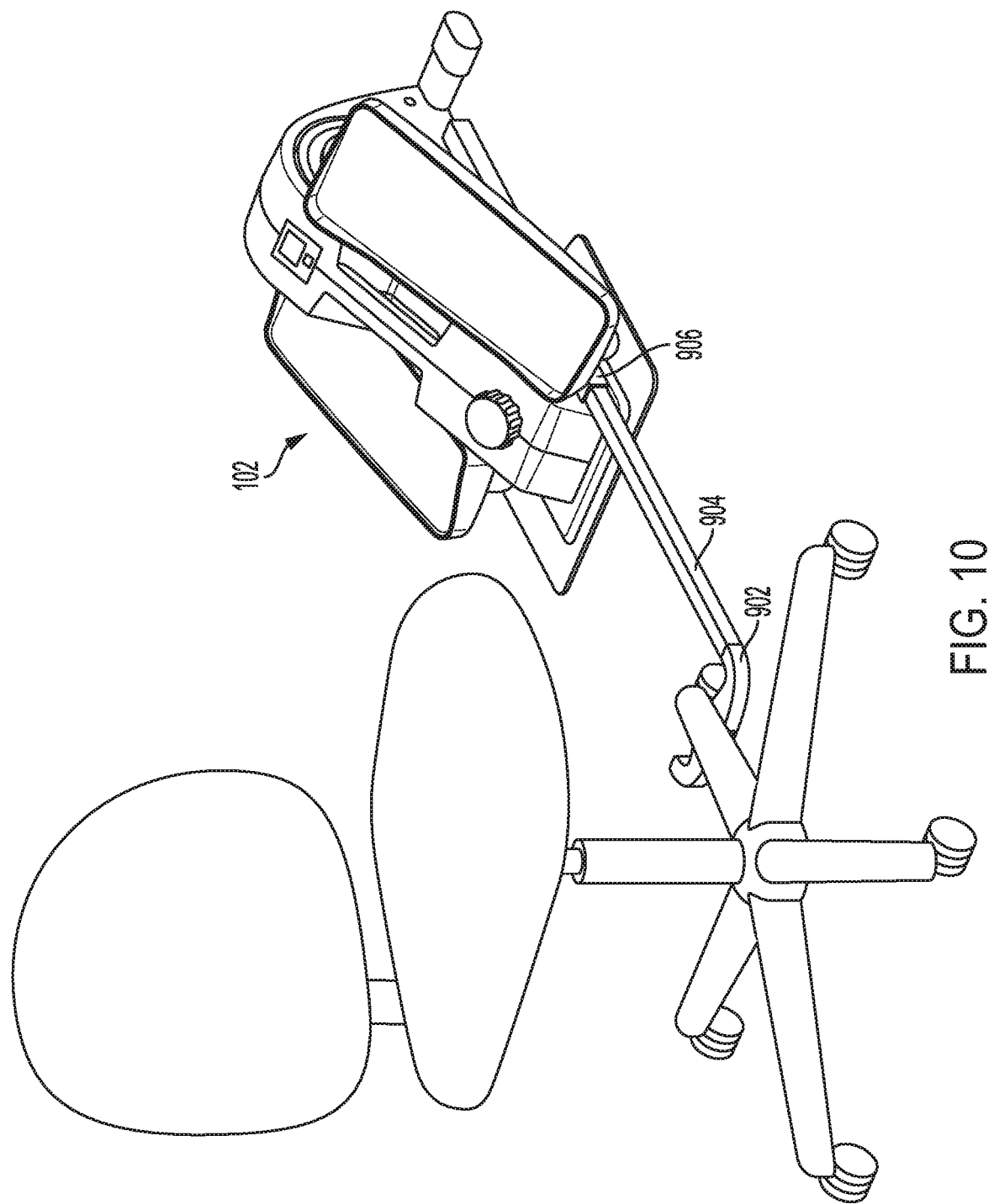
FIG. 10 depicts the transport mechanism in an extended position coupled to a chair caster.

FIG. 10 depicts transport mechanism 900 in an extended configuration achieved by pressing button 908 and extending telescoping tube 904 until it is fully extended. Any known methods of locking telescoping tube in the extended and/or closed position. For example, any locking mechanism, such as those employed on telescoping luggage handles, may be utilized. Alternatively, in another embodiment, a spring-biased device may be utilized such as those used to lock exercise equipment parts at various extension lengths.

When handle 902 is extended, it can be used as a "hook" which can be placed around a chair caster or chair leg as depicted in FIG. 10. This helps to prevent the exercise device 102 from sliding away from the user when in use.

Handle 902 generally has a rectangular U-shape and has a width that is wider than housing 102-1aa, but less than a distance between edges of wheels 102-1f. This enables handle 902 to wrap around housing 102-1aa when transport mechanism 900 is in its closed form as depicted in FIG. 9.

Figure 11A:
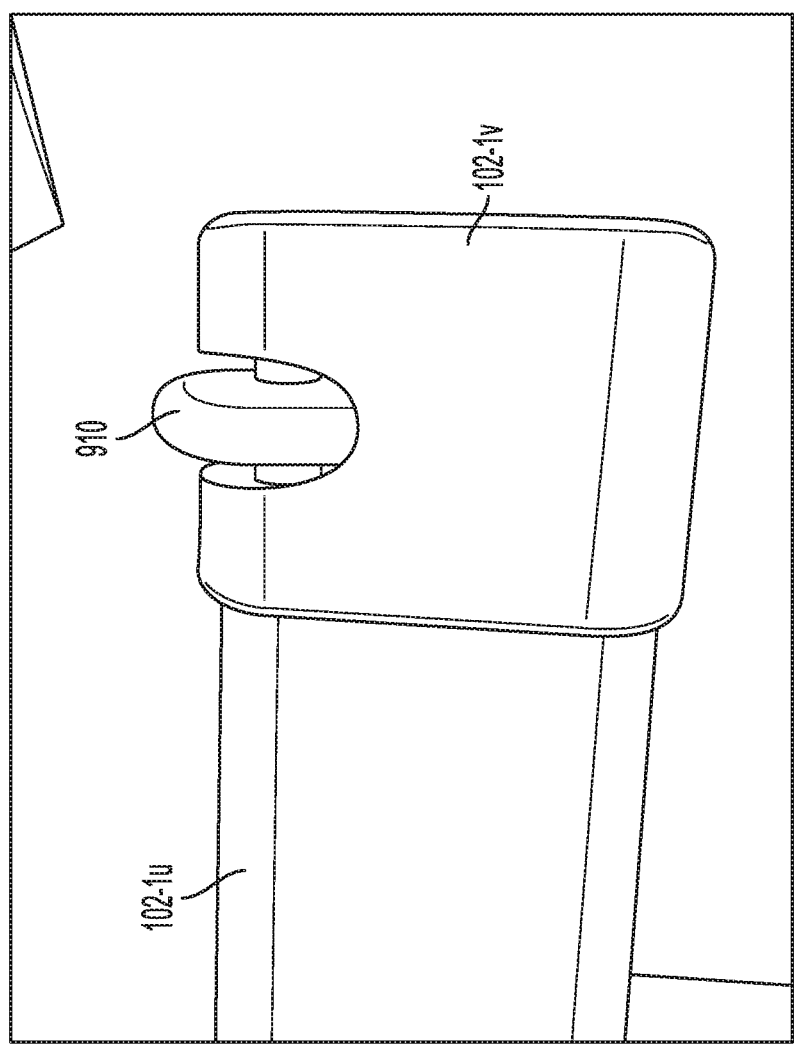
FIGS. 11A and 11B depict rollers utilized to move the exercise device in combination with the transport mechanism.
Figure 11B:
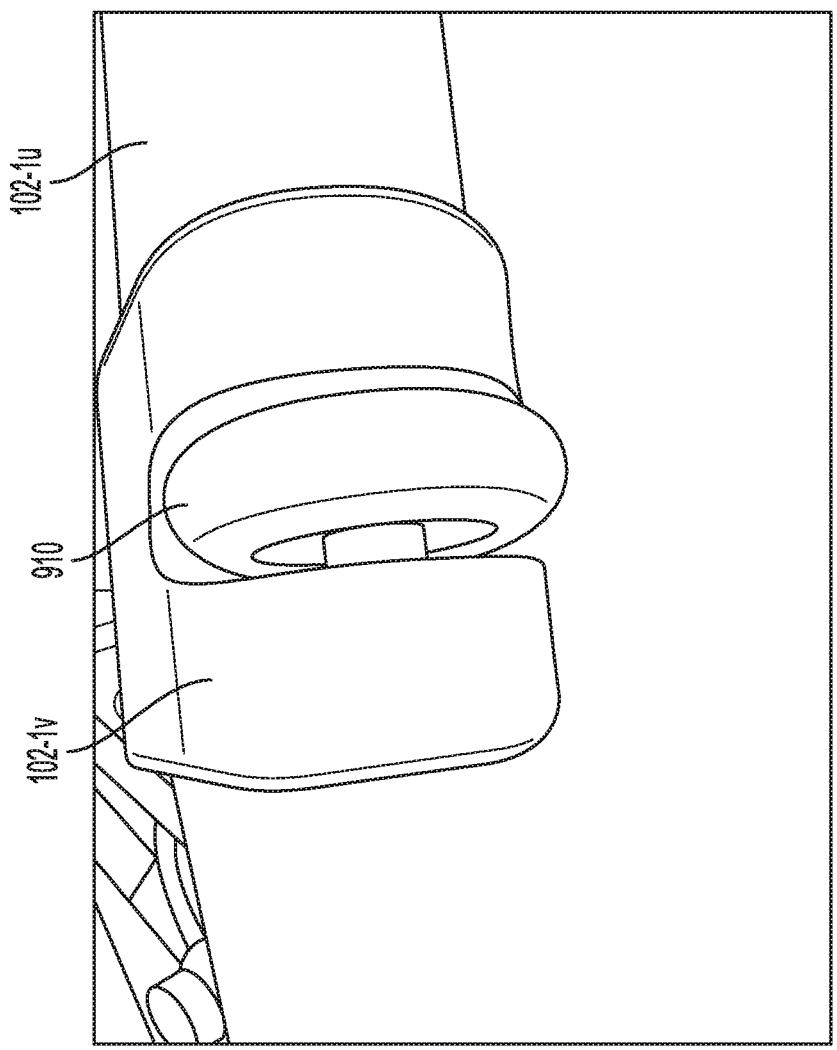

Handle 902 can also be used to transport exercise device 102, similar to a wheeled suitcase. In this embodiment depicted in FIGS. 11A and 11B, front bar 102-1u comprises one or more rollers 910 arranged on each side of housing 102-1aa along a rear of front bar 102-1u. As depicted, rollers 910 are arranged such that they are located above ground level and extend past a rear of front bar 102-1u. This allows rollers 910 only to engage the ground when handle 902 is used to angle exercise device 102 upward for transport. The depicted embodiment shows the rollers 910 centered on an axel located within front bar 102-1u. However, it should be apparent that any form of roller, such as a swivel caster, could also be utilized and attached to front bar 102-1u.

Figure 12:
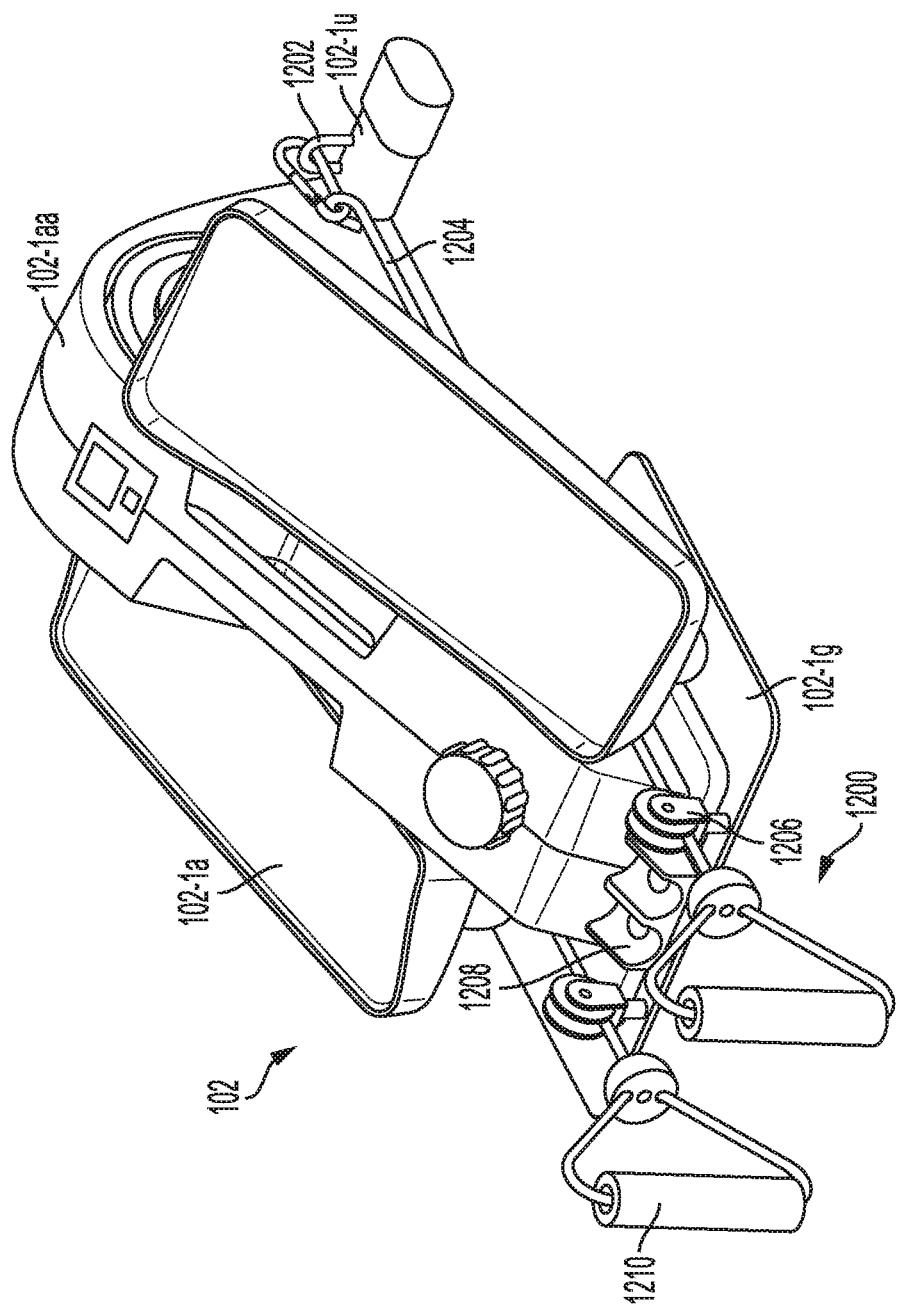
FIGS. 12-14 depict an embodiment of a resistance band extension for the exercise device.
Figure 13:
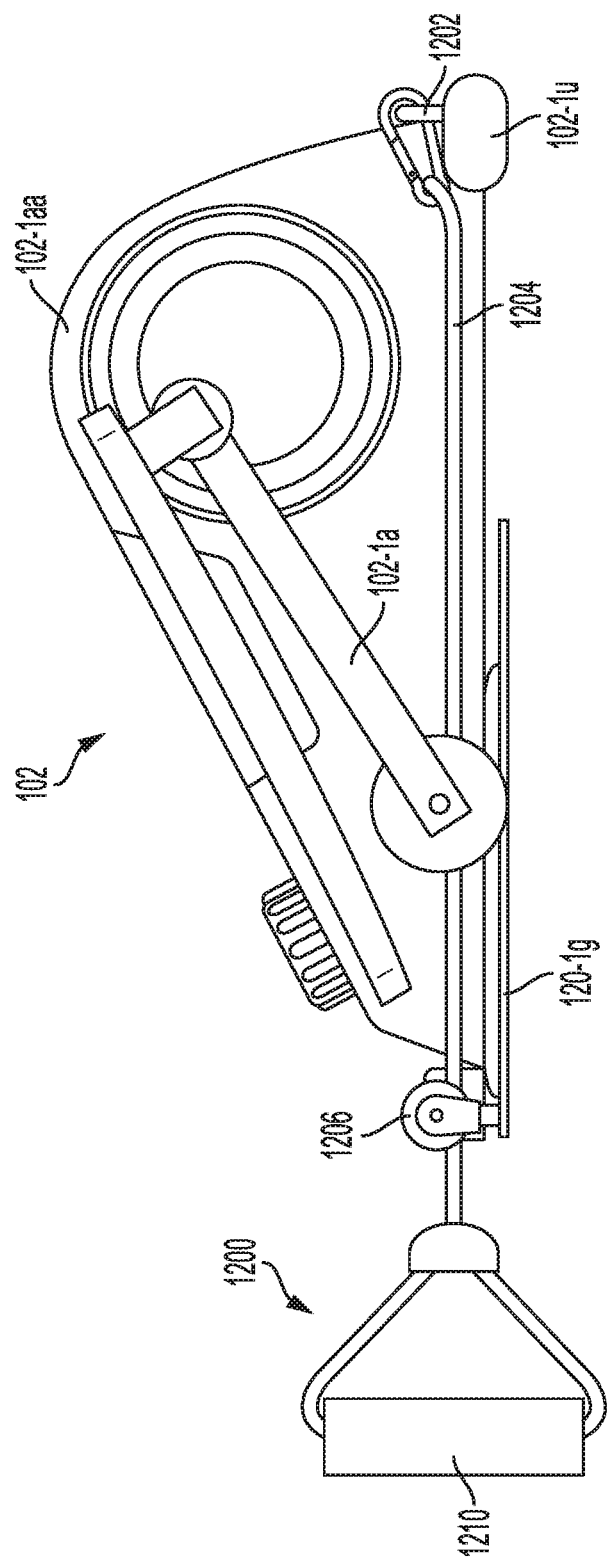
Figure 14:
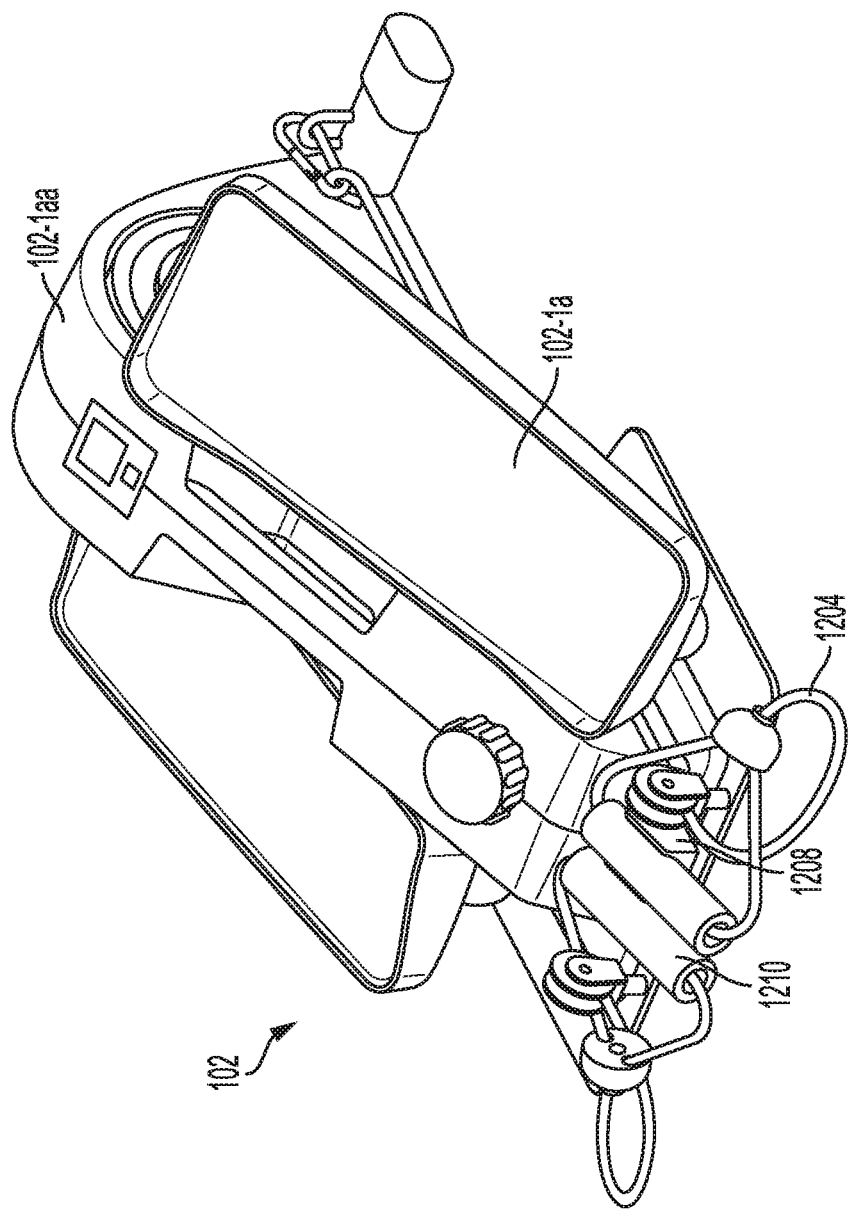

FIGS. 12-14 depict an embodiment of exercise device 102 incorporating a resistance band extension 1200. Generally, resistance band extension 1200 comprises attachment points 1202, resistance bands 1204, pulleys 1206, and holder 1208. Attachment points 1202 are coupled to chassis front bar 101-1u in the vicinity of housing 102-1aa (i.e., one on each side at a same position). Preferably, the two attachment points 1202 are located as close as possible to housing 102-1aa (on the left and right sides) so as not to interfere with use of exercise device 102. Attachment points 1202 are preferably metal rings or hooks securely fastened (or formed integrally) with chassis front bar 101-1u.

First ends of resistance bands 1204 are secured to attachment points 1202 using any known removable fastening technique, such as a clip (as shown) or a carabineer attached to an end of resistance bands 1204. Second ends of resistance bands 1204 terminate in handles 1210 which users can utilize to perform various exercises as will be described later.

Handles 1210 can optionally be removed so that both resistance bands 1204 can be connected together via a single handle 1210 to perform exercises aligned with a central axis of the user, such as curls. Or in another embodiment, the handles 1210 can be connected using magnets or Velcro to form a single handle to perform exercises such as rows.

The handles 1210 can also be swapped with an alternate version that is more suitable for individuals with weak grip strength such as a glove or a hook that connects the user's hands to the cords without needing to grip. For example, a glove type grip could be connected to resistance bands 1204 that a user could slip their hands into, reducing the need for the user to make a tight grip on handler 1204 to perform exercises. Alternatively, handles 1210 can attach a mechanism that enables user to pull the resistance band 1204 simply by hooking the hand, wrist and arm in.

Pulleys 1206 are mounted to base plate 102-1g in front of housing 102-1aa. Preferably, pulleys 1206 are axially aligned with attachment points 1202 such that the resistance bands 1204 are parallel to housing 1204 when threaded through pulleys 1206. A portion of resistance bands 1204 are passed through the underside of the pulley 1206 as depicted in FIG. 13. Further, pulleys 1206 serve to prevent resistance bands 1204 from interfering with the elliptical motion of pedals 102-1a. The pulleys 1206 may be either swivel or fixed pulleys. Thus, a user of exercise device 102 can concurrently perform exercises using both resistance bands 1204 and pedals 102-1a if desired.

When resistance bands 1204 are not being utilized, they can be stored in holder 1208 as depicted in FIG. 14. Preferably, holder 1208 has two channels which provide a snap-fit connection with handles 1210 when they are placed in holder 1208.

Figure 15:
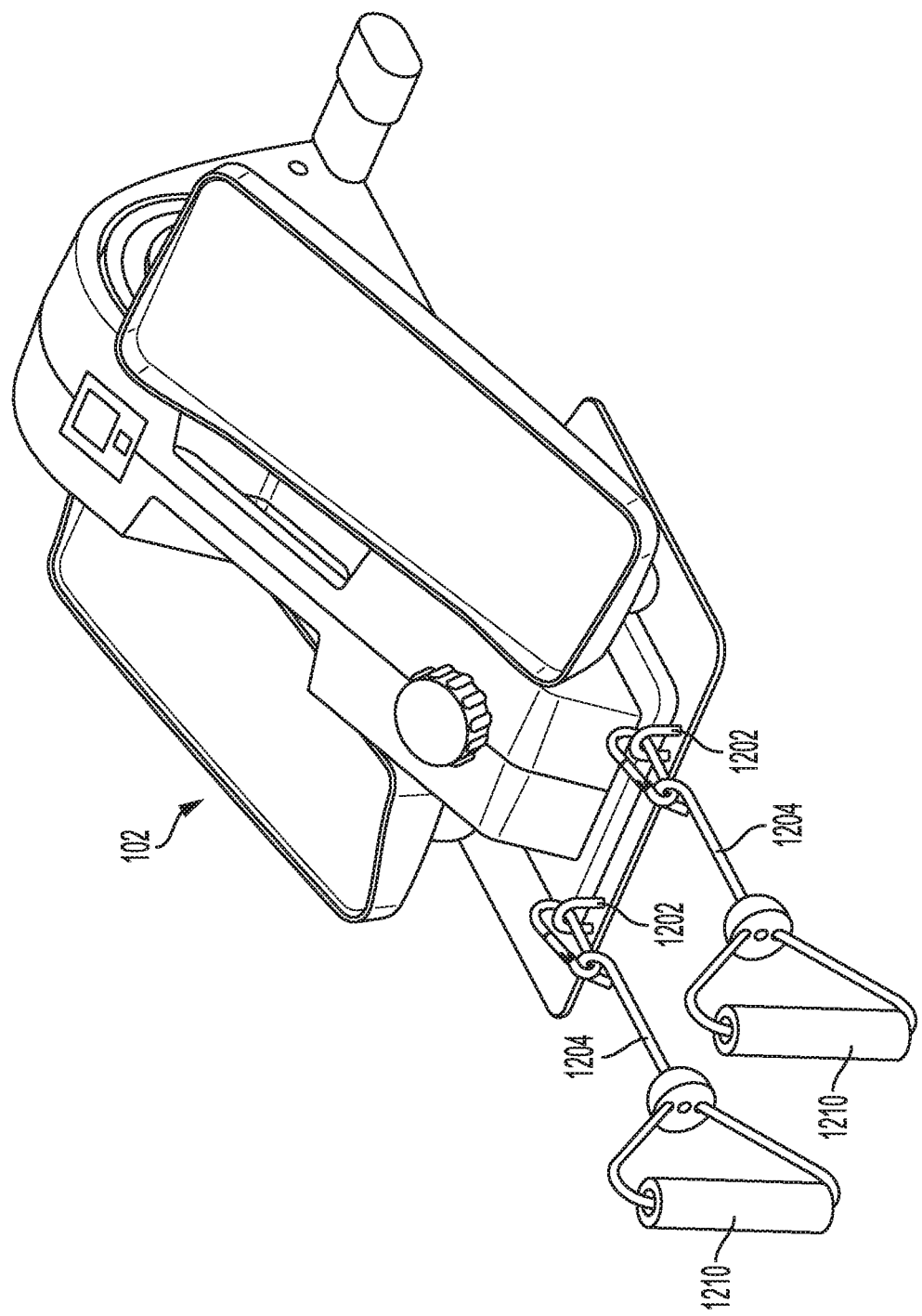
FIG. 15 depicts an alternate embodiment of a resistance band extension for the exercise device.

In another embodiment, as depicted in FIG. 15, attachment points 1202 can be placed at the locations of pulleys 1206, allowing resistance bands 1204 to be attached directly to the front of exercise device 102.

Resistance band extension 1200 can be used while seated or standing. While using the resistance band extension 1200 in a standing posture, the user should not be standing on the exercise device 102 for safety reasons.

Exercises that can be achieved with the resistance band extension 1200 include, but are not limited to:
1) Bicep curls
2) Tricep extensions
3) Upright rows
4) Cross body reaches These movements can be combined to create a series of routines that help users develop strength and endurance of the upper body parts.

Resistance band extension 1200 can be used for multiple purposes and has benefits that appeal to a wide range of users. Specific industries for which the resistance band extension 1200 is considered useful include:

Physical therapy and rehabilitation:
Target users are diverse and may cover people of certain medical conditions including but not limited to osteoporosis, acute rheumatic arthritis, and Multiple Sclerosis, or who have completed medical procedures including but not limited to hip-and-joint replacement surgery or procedures that are followed by weakness of the muscles and joints. Exercise with the resistance band extension 1200 for this specific use case should at most times be supervised or prescribed by medical practitioners.

Strength training:
Target users are diverse and may include people of all ages, gender and physique. The resistance band extension 1200 provides upper body exercise movements that are particularly useful to build strength of the shoulder, biceps, triceps, lats, and chest.

Weight loss program:
Target users are diverse and may include people of all ages, gender and physique. The resistance band extension 1200 provides low-intensity upper body exercise which along with the exercise device 102 provides calorie-burning movements that may contribute to weight loss.

The configuration of the resistance band extension 1200 ensures that the user can perform a wide range of upper body exercise movements both while moving the legs with the exercise device 102 or while standing.

To serve these multiple usage configurations and a range of user types, the resistance band extension 1200 provides the following advantages. The handles 1210 are placed towards the front side of the exercise device 102. This placement of resistance bands 1204 and handles 1208 enables a much wider range of exercise movements, especially while seated. For example, bicep curls can be performed without the resistance cords interfering with pedals 102-1a.

Further, by routing the resistance bands through pulleys 1206, there is no interference or blocking access to any parts of exercise device, such as control dial 102-1i. The precise placement of the pulleys 1206 on the base plate 102-1g ensures that the resistance bands 1204 do not physically contact any moving parts.

Because resistance bands 1204 are removable, the tension level and/or the length of resistance bands 1204 can easily be swapped with another cord of lower or higher tension level in order to change the tension acting on the cord. Alternatively, the mechanism can be modified to include a resistance knob that mechanically controls the tension level acting on a cord.

The length of the resistance bands 1204 may be adjustable or extendable. This feature enables of various height and limb lengths to use the apparatus. The adjustment in length can be achieved in multiple ways including, but not limited to, 1) switching between cords of varying lengths, and/or 2) clipping on extension cords using an adapter piece.

Figure 16:
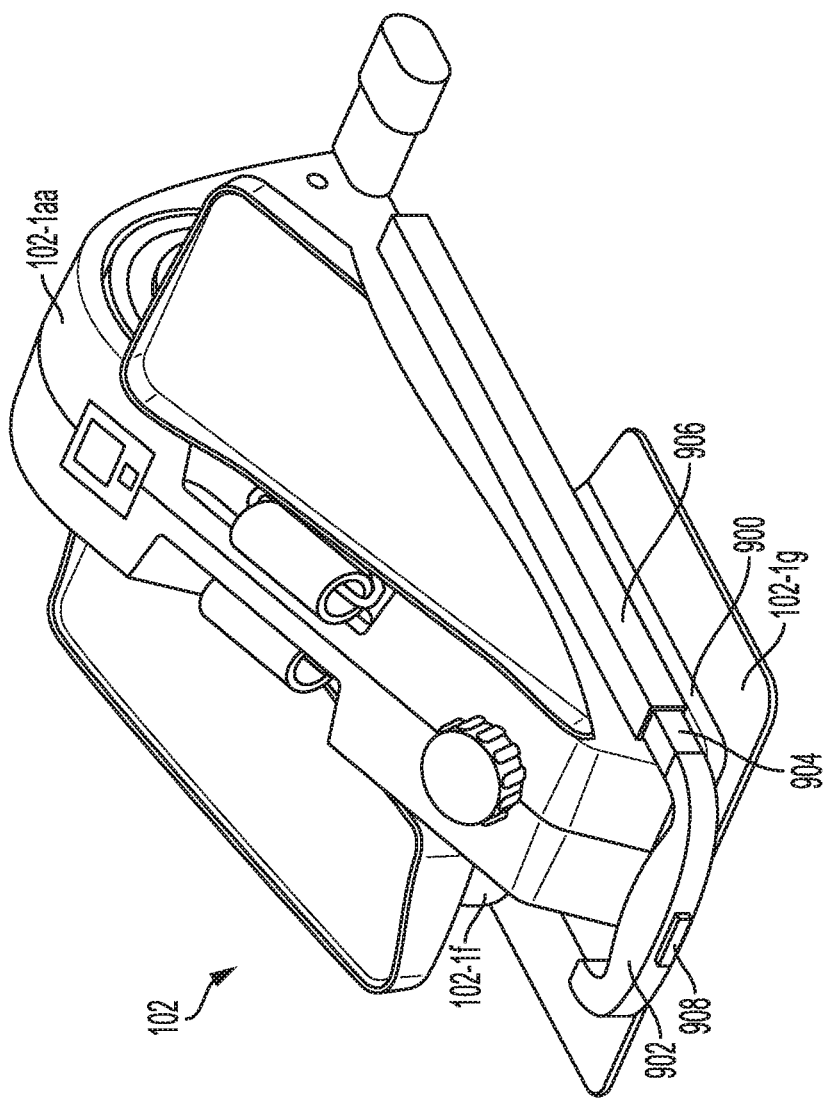
FIG. 16 depicts another embodiment of a resistance band extension for the exercise device.
Figure 17:
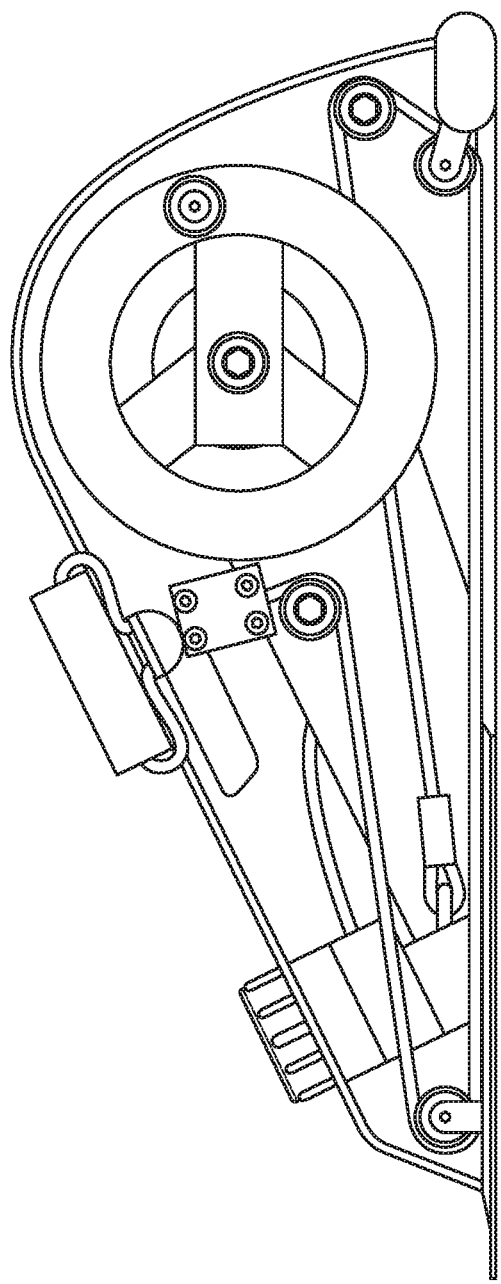
FIG. 17 depicts the internal routing of the resistance band extension of FIG. 16.

FIG. 16 depicts an alternate embodiment of resistance band extension 1200. In this embodiment, holder 1208 is located immediately adjacent handle 102-1h. The user can use the resistance band 1204 in this embodiment by grasping handles 1210. The length of the resistance band is located substantially within housing 102-1aa as depicted in FIG. 17. As shown, attachment point 1202 is located toward a front of exercise device 102. The length of the resistance band 1204 is routed in a clockwise pattern through a series of pulleys 1206. The resistance band extends from attachment point 1202, towards a back of exercise device 102 where it is routed 180 degrees through two pulleys 1206 behind pulley 102-1b so as not to interfere with the exercise device 102 when in use. A third pulley 106, located toward a front of exercise device 102 routes the resistance band 104 towards a final fourth pulley 106, after which the resistance band exits housing 102-1aa and terminates in handles 1210 which prevent resistance band 1204 from accidentally being retracted into housing 102-1aa due to contraction of resistance band 1204. FIG. 17 only depicts the routing of the right resistance band 1204. However, the left resistance band is also routed in a similar manner on the other side of exercise device 102.

As the user utilizes resistance band 1204, its stretching is accommodated by pulleys 1206 which allow for fluid stretching and retraction of resistance band 1204. When a user is not using resistance band extension 1200, handles 1208 can be placed in holders 1208.

Figure 18:
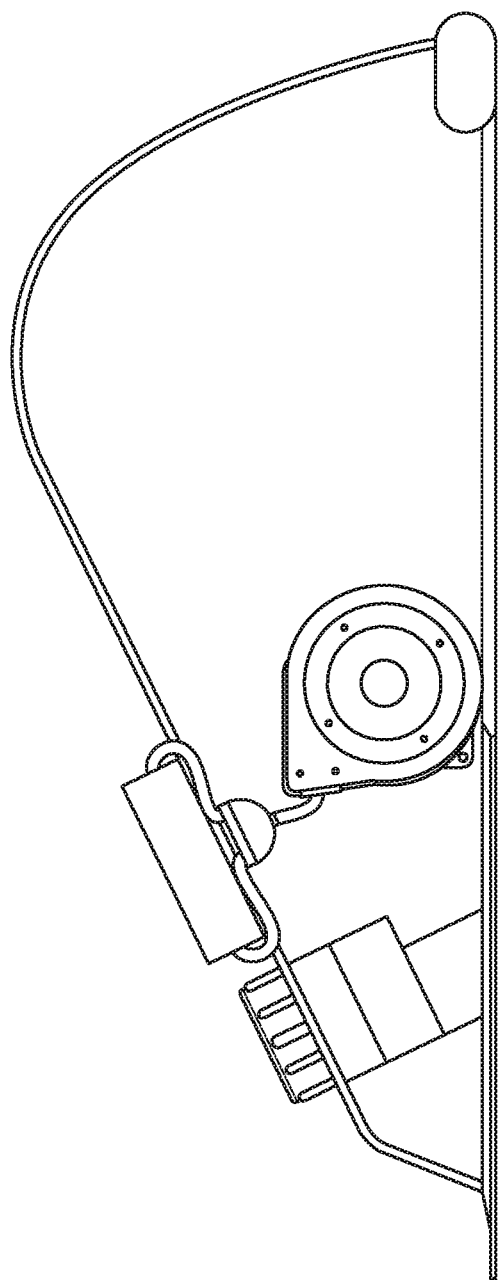
FIG. 18 depicts an alternate embodiment of the internal routing of the resistance band extension of FIG. 16.

FIG. 18 depicts an alternate embodiment of resistance band extension 1200. Here, instead of routing the resistance band 1204 through a series of pulleys 1206 as in FIG. 17, the length of the resistance band 1204 is instead accommodated within a retraction device 1702. Retraction device 1702 acts similar to how a tape measure retraction system works (e.g., uses a spiral torsion spring to provide retraction and resistance). It should be obvious that any type of retraction device 1702 can be used as long as it provides enough resistance for exercise using resistance band 1204.

Figure 19:
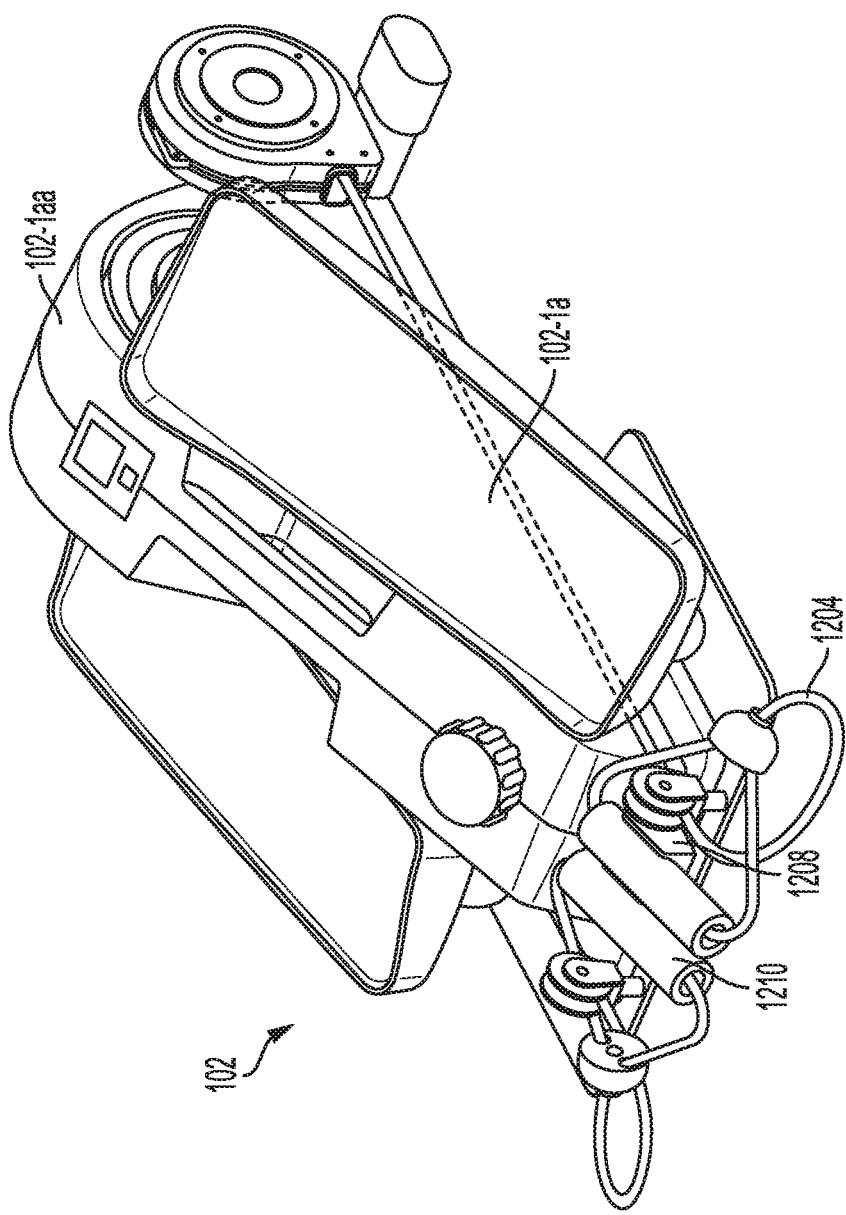
FIG. 19 depicts another embodiment of a resistance band extension of FIG. 16.

FIG. 19 depicts another alternate embodiment of resistance band extension 1200. Here, instead of retraction devices 1702 being located internal to housing 102-1aa, two retraction devices 1702 are mounted to front bar 102-1u and the resistance band 104 is routed through pulleys 106 like described in FIG. 13. In all the described embodiments, it should be clear that a resistance band 1204 can be arranged on one or both sides of exercise device 102.

Figure 20:
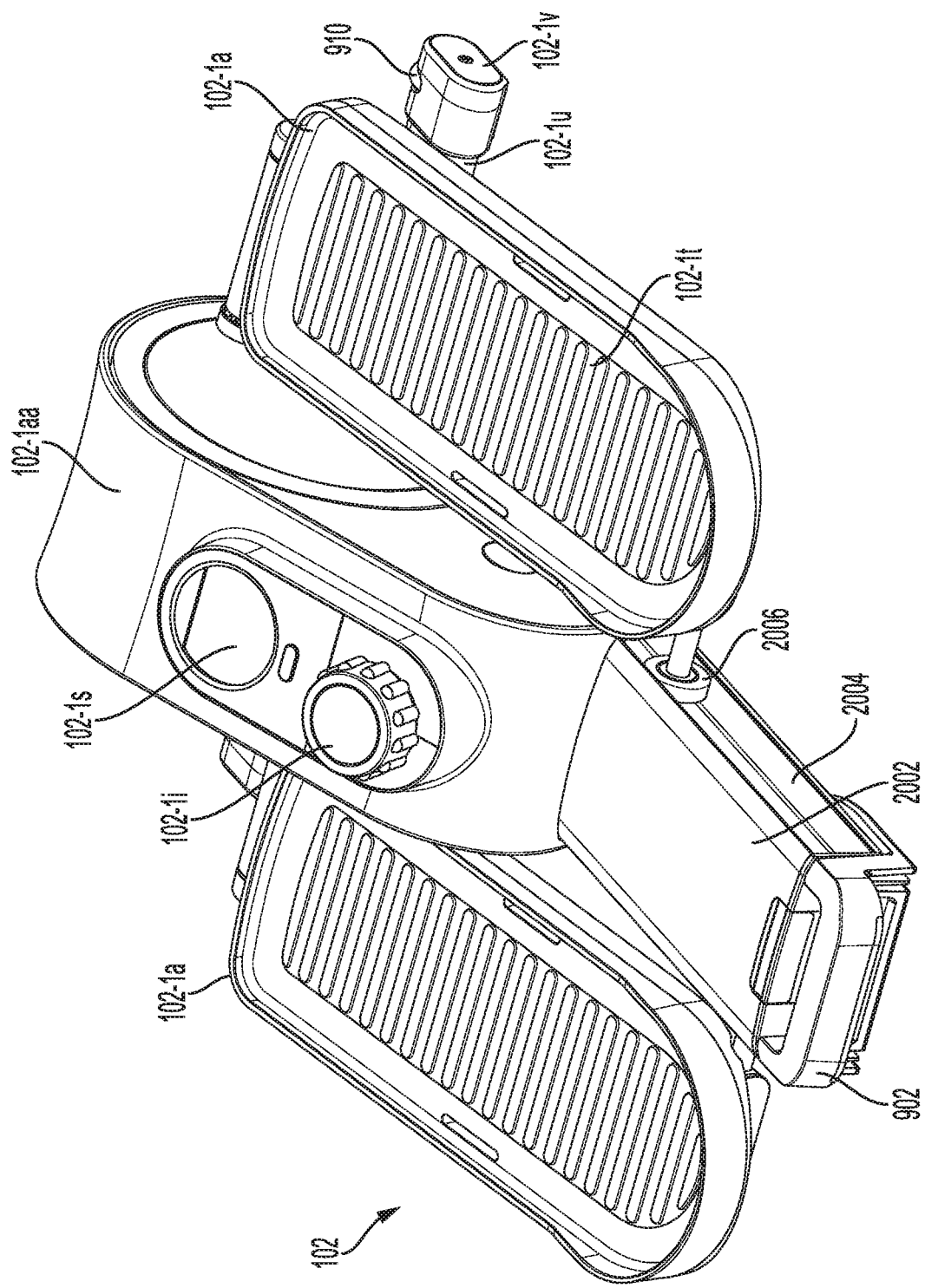
FIG. 20 depicts an alternate embodiment of the exercise device.

FIG. 20 depicts an alternate embodiment of exercise device 102 incorporating transport mechanism 2002. This embodiment is similar to that shown in FIG. 10, including handle 902, so only the differences in the embodiments are explained herein for conciseness. In this embodiment, the length of housing 102-1aa has been shortened by removing handle 102-1h. This allows display 102-1s and control dial 102-1i to be positioned next to each other. This also allows the tensioning mechanism and flywheel to be placed closer together within housing 102-1aa.

Having handle located at the end of transport mechanism 2002 places the handle 902 closer to the user, especially when exercise device 102 is placed under a desk and handle 902 may be difficult to reach.

In this embodiment, display 102-1s is larger, making it easy to read. In some embodiments, display 102-1s is removable. Further, removal of handle 102-1h from housing 102-1aa allows control dial 102-1i to be placed higher by approximately 3", making adjustment easier for the user.

Transport mechanism 2002 extends from a front of housing 102-1aa and helps to stabilize exercise device 102 during use. Each side of transport mechanism 2002 incorporates a track 2004 which engages with wheel 2006 extending from an interior front side of pedal 102-1a. The left and right pedals 102-la incorporate the same construction, only mirrored.

Tracks 2004 allow for the removal of wheels 102-1f from the bottom of pedals 102-la as well as the removal of base plate 102-1g, making exercise device 102 lighter. This alternate configuration also helps ensure that pedals 102-1a do not move during transport since they are constrained by rails 2004.

By moving the wheel 2006 to the side of pedal 102-1a, heel height is reduced by up to 1.25", allowing more comfortable use of exercise device 102 by taller people or those with lower desks. Also, since tracks 2004 are horizontal, they will generally collect less dust or debris compared to base plate 102-1g.

Figure 21:
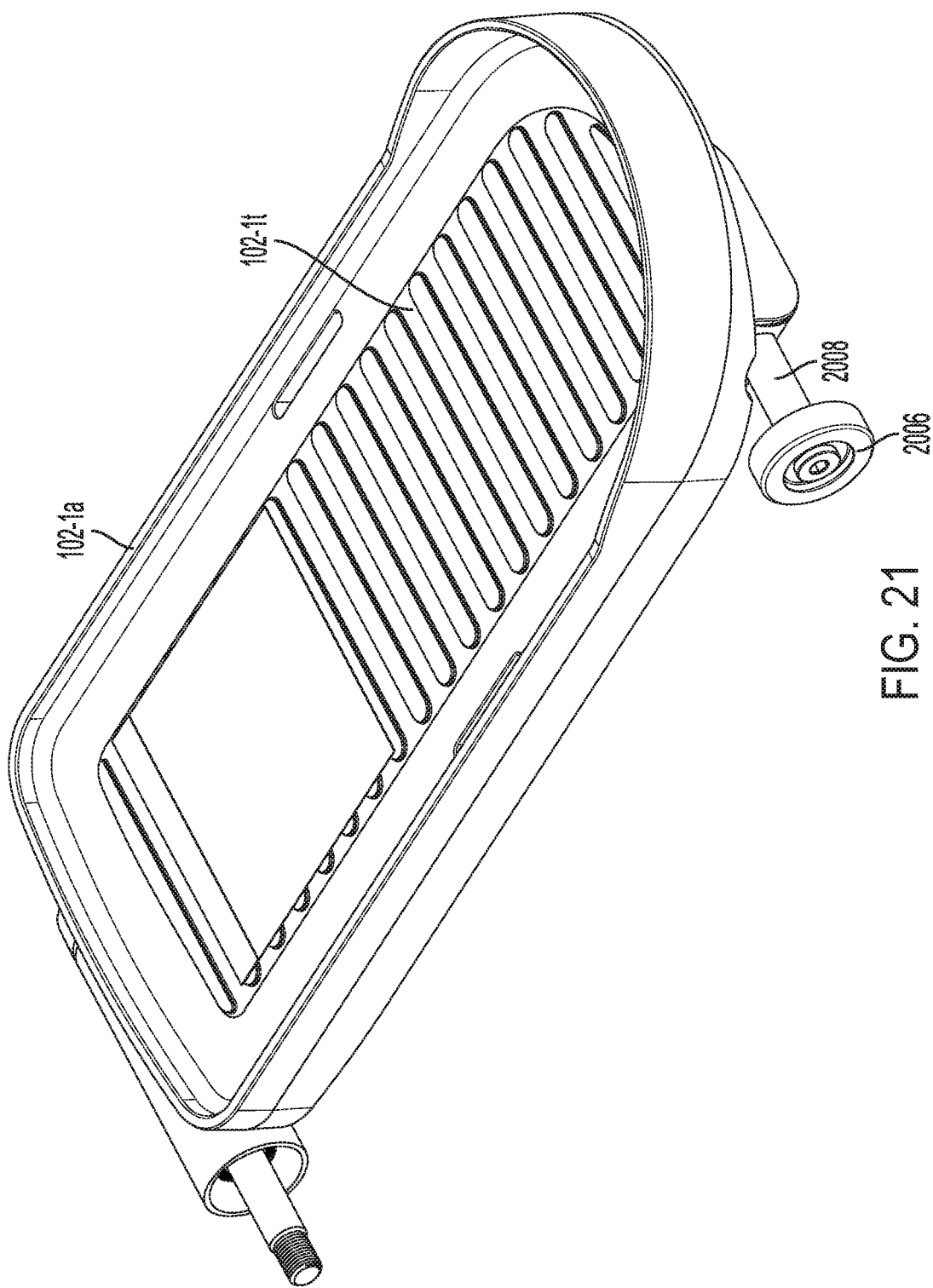
FIG. 21 depicts a view of the right pedal of the exercise device of FIG. 20 in isolation.

FIG. 21 depicts a pedal 102-1a in more detail. As shown, wheel 2006 extends from a bottom of pedal 102-1a on post 2008. Wheel 2006 freely rotates on post 2008 during use of exercise device 102.

Figure 22:
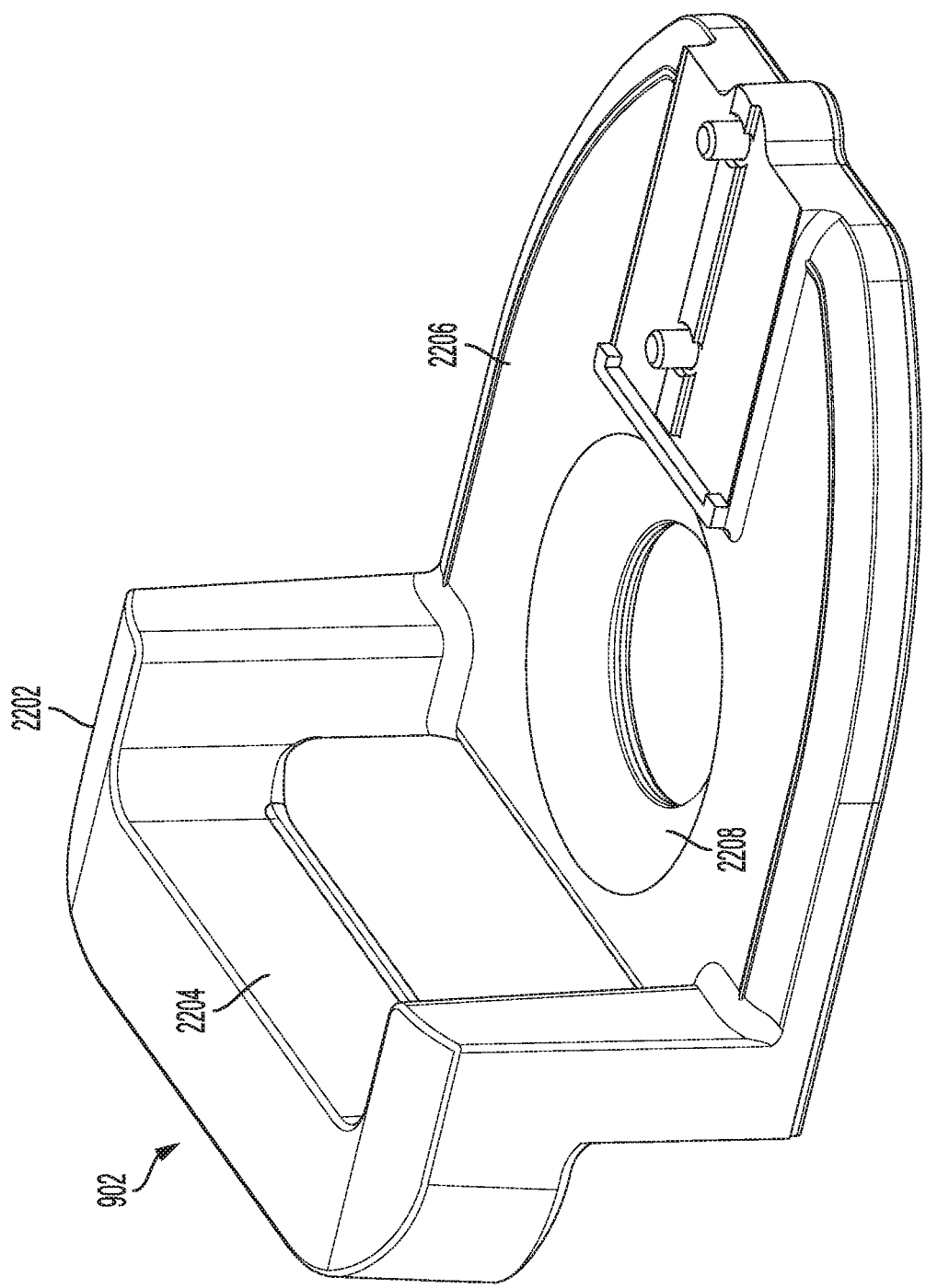
FIG. 22 depicts a view of the handle of FIG. 20 in isolation.

FIG. 22 depicts a perspective view of an alternate embodiment of handle 902 coupled to transport mechanism 2002. In this embodiment, handle 902 incorporates raised grip 2202 which can be grasped by a user when transporting exercise device 102. Notch 2204, in the upper portion of raised grip 2202, helps to prevent lateral movement of exercise device 102 by constraining lateral movement of a chair wheel placed in handle 902.

Handle 902 further incorporates base 2206 with open recess 2208. The sidewalls of open recess 2208 are preferably either angled or curved to urge a chair wheel placed on handle 902 into open recess 2208. Open recess 2208 and notch 2204 both help to firmly secure any chair wheel placed therein, especially those on office chairs.

Figure 23:
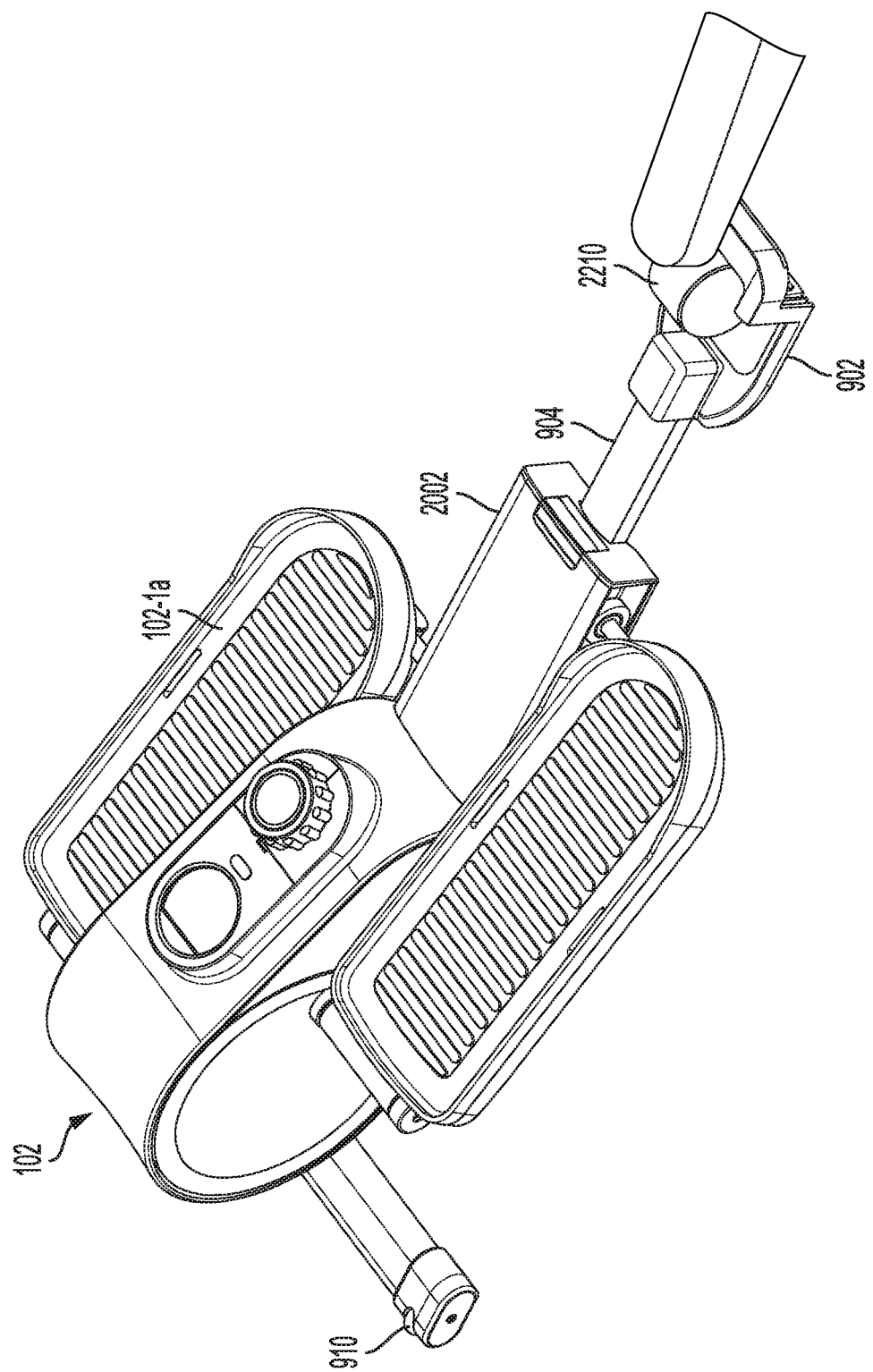
FIG. 23 depicts the transport mechanism in an extended position and coupled to a chair wheel.

FIG. 23 depicts transport mechanism 2002 fully extended and coupled to chair wheel 2210. As shown, chair wheel 2210 is placed into open recess 2208 and a rear of chair wheel 2210 is constrained by notch 2204. Telescoping tube 904, which resides in transport mechanism 2002 when not in use, allows the distance of handle 902 from exercise device 102 to be adjusted according to user preference.

Exercise device 102 can be transported by extending handle 902 and then angling exercise device 102 so that rollers 910 contact the ground. Exercise device 102 can then be transported to any location desired by the user.

It is to be understood that the disclosure teaches examples of the illustrative embodiments and that many variations of the invention can easily be devised by those skilled in the art after reading this disclosure and that the scope of the present invention is to be determined by the claims below.

The invention claimed is:

1. A portable exercise apparatus comprising:
a chassis;
a transport mechanism extending from a rear side of the chassis;
a front bar coupled to a front side of the chassis;
a left pedal;
a right pedal,
wherein a first end of the left pedal is coupled to a left side of the chassis, and
wherein a first end of the right pedal is coupled to a right side of the chassis;
a left track formed on a left side of the transport mechanism; and
a right track formed on a right side of the transport mechanism,
wherein a second end of the left pedal comprises a left wheel confined to linear movement within the left track, and
wherein a second end of the right pedal comprises a right wheel confined to linear movement within the right track.

2. The portable exercise apparatus according to claim 1, further comprising:
a telescoping tube configured to move between a retracted position and an extended position from an interior channel in the transport mechanism; and
a handle coupled to an end of the telescoping tube.

3. The portable exercise apparatus according to claim 2, further comprising:
a first roller and a second roller in the front bar,
wherein the first roller and the second roller contact a ground surface only when the portable exercise apparatus is angled upward using the handle more than a predetermined angle.

4. The portable exercise apparatus according to claim 3, wherein the first roller and the second roller do not contact the ground surface when the portable exercise apparatus is placed flat on the ground surface.

5. The portable exercise apparatus according to claim 2, wherein the handle comprises;
an opening in a base of the handle; and
an open grip extending upward from the base configured to be grasped by a user.

6. The portable exercise apparatus according to claim 5, wherein sidewalls of the opening are angled or curved.

7. The portable exercise apparatus according to claim 5, wherein the open grip comprises a horizontal notch configured to snugly accommodate a chair wheel placed therein.

8. The portable exercise apparatus according to claim 7, wherein the opening and the horizontal notch releasably couple the portable exercise apparatus to the chair wheel when the chair wheel is placed in the opening.

* * * * *